US012586599B2

(12) United States Patent
Zhang et al.

(10) Patent No.: US 12,586,599 B2
(45) Date of Patent: Mar. 24, 2026

(54) AUDIO SIGNAL PROCESSING METHOD AND APPARATUS, ELECTRONIC DEVICE, AND STORAGE MEDIUM WITH MACHINE LEARNING AND FOR MICROPHONE MUTE STATE FEATURES IN A MULTI PERSON VOICE CALL

(71) Applicant: TENCENT TECHNOLOGY (SHENZHEN) COMPANY LIMITED, Guangdong (CN)

(72) Inventors: Siyu Zhang, Shenzhen (CN); Yi Gao, Shenzhen (CN); Cheng Luo, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 313 days.

(21) Appl. No.: 18/312,688

(22) Filed: May 5, 2023

(65) Prior Publication Data

US 2023/0317096 A1     Oct. 5, 2023

Related U.S. Application Data

(63) Continuation of application No. PCT/CN2022/111474, filed on Aug. 10, 2022.

(30) Foreign Application Priority Data

Sep. 16, 2021     (CN) .......................... 202111087468.5

(51) Int. Cl.
*G10L 21/0364*     (2013.01)
*G06F 3/16*     (2006.01)
(Continued)

(52) U.S. Cl.
CPC .......... *G10L 21/0364* (2013.01); *G06F 3/165* (2013.01); *G10L 17/02* (2013.01);
(Continued)

(58) Field of Classification Search
CPC ..... G10L 21/02; G10L 21/0364; G10L 25/84; H04M 1/60; H04M 3/568
See application file for complete search history.

(56) References Cited

U.S. PATENT DOCUMENTS 6,671,667 B1 * 12/2003 Chandran ........... G10L 21/0208
704/226
6,810,273 B1 * 10/2004 Mattila ............... G10L 21/0208
379/406.01
(Continued)

FOREIGN PATENT DOCUMENTS

CN          1565144 A     1/2005
CN     107276777 A     10/2017
(Continued)

OTHER PUBLICATIONS

Office Action issued Sep. 17, 2024 in Japanese Application No. 2023-551247.
(Continued)

*Primary Examiner* — Shaun Roberts
(74) *Attorney, Agent, or Firm* — Sughrue Mion, PLLC

(57)          ABSTRACT

Herein are disclosed an audio signal processing method and apparatus, an electronic device, and a storage medium. The method includes: obtaining an audio signal acquired by an application while an account logging into the application is in a microphone mute state in a multi-person voice call; obtaining gain parameters, for each of a plurality of audio frames in the audio signal, respectively on a plurality of bands in a first band range; and outputting a prompt message responsive to a determination, based on the gain parameters, (Continued)

that a target voice is contained in the audio signal, the prompt message providing a prompt to disable the microphone mute state of the account.

17 Claims, 8 Drawing Sheets

(51) Int. Cl.

| | |
|---|---|
| *G10L 17/02* | (2013.01) |
| *G10L 21/034* | (2013.01) |
| *G10L 25/21* | (2013.01) |
| *G10L 25/30* | (2013.01) |
| *G10L 25/84* | (2013.01) |
| *H04M 3/56* | (2006.01) |
| *G10L 25/18* | (2013.01) |

(52) U.S. Cl.

CPC ............ *G10L 21/034* (2013.01); *G10L 25/21* (2013.01); *G10L 25/30* (2013.01); *G10L 25/84* (2013.01); *H04M 3/568* (2013.01); *G10L 25/18* (2013.01)

(56) References Cited

U.S. PATENT DOCUMENTS

| | | | | |
|---|---|---|---|---|
| 7,359,504 | B1* | 4/2008 | Reuss ................... | H04M 9/082 |
| | | | | 379/406.01 |
| 8,903,721 | B1* | 12/2014 | Cowan ................... | H04R 3/005 |
| | | | | 704/226 |
| 9,473,643 | B2 | 10/2016 | Baran et al. | |
| 10,805,740 | B1* | 10/2020 | Snyder ................. | H04R 25/407 |
| 2004/0260550 | A1 | 12/2004 | Burges et al. | |
| 2006/0280295 | A1* | 12/2006 | Runcie ................. | H04M 1/247 |
| | | | | 379/142.1 |
| 2008/0052074 | A1* | 2/2008 | Gopinath .............. | G10L 21/028 |
| | | | | 704/E21.013 |
| 2009/0022305 | A1* | 1/2009 | Chavez ............... | H04M 1/6008 |
| | | | | 379/388.03 |
| 2010/0080382 | A1* | 4/2010 | Dresher .............. | H04M 1/6033 |
| | | | | 379/421 |
| 2010/0324891 | A1* | 12/2010 | Cutler ..................... | G10L 25/78 |
| | | | | 381/122 |
| 2013/0321156 | A1* | 12/2013 | Liu ........................ | H04M 1/724 |
| | | | | 340/573.1 |
| 2015/0195411 | A1* | 7/2015 | Krack ................... | H04M 3/569 |
| | | | | 379/202.01 |
| 2016/0182727 | A1 | 6/2016 | Baran et al. | |
| 2016/0295539 | A1* | 10/2016 | Atti ...................... | H04R 29/007 |
| 2017/0092288 | A1* | 3/2017 | Dewasurendra ......... | H04R 1/08 |
| 2020/0043514 | A1* | 2/2020 | Liu ......................... | G10L 15/22 |
| 2020/0312343 | A1* | 10/2020 | Hsiung ................. | G06N 3/048 |
| 2021/0125625 | A1* | 4/2021 | Huang ................... | G10L 25/21 |
| 2024/0195916 | A1* | 6/2024 | Schiøler ................. | G06F 3/167 |

FOREIGN PATENT DOCUMENTS

| | | |
|---|---|---|
| CN | 110085249 A | 8/2019 |
| CN | 110111805 A | 8/2019 |
| CN | 110769354 A | 2/2020 |
| CN | 111343410 A | 6/2020 |
| CN | 111415685 A | 7/2020 |
| CN | 111429932 A | 7/2020 |
| CN | 113113039 A | 7/2021 |
| JP | 2010102203 A | 5/2010 |

OTHER PUBLICATIONS

International Search Report of PCT/CN2022/111474 dated Oct. 25, 2022 [PCT/ISA/210].

Written Opinion of PCT/CN2022/111474 dated Oct. 25, 2022 [PCT/ISA/237].

Extended European Search Report dated Oct. 15, 2024 in application No. 22868900.6.

Communication from the Chinese Patent Office in Application No. 202111087468.5 dated Jul. 19, 2025.

\* cited by examiner

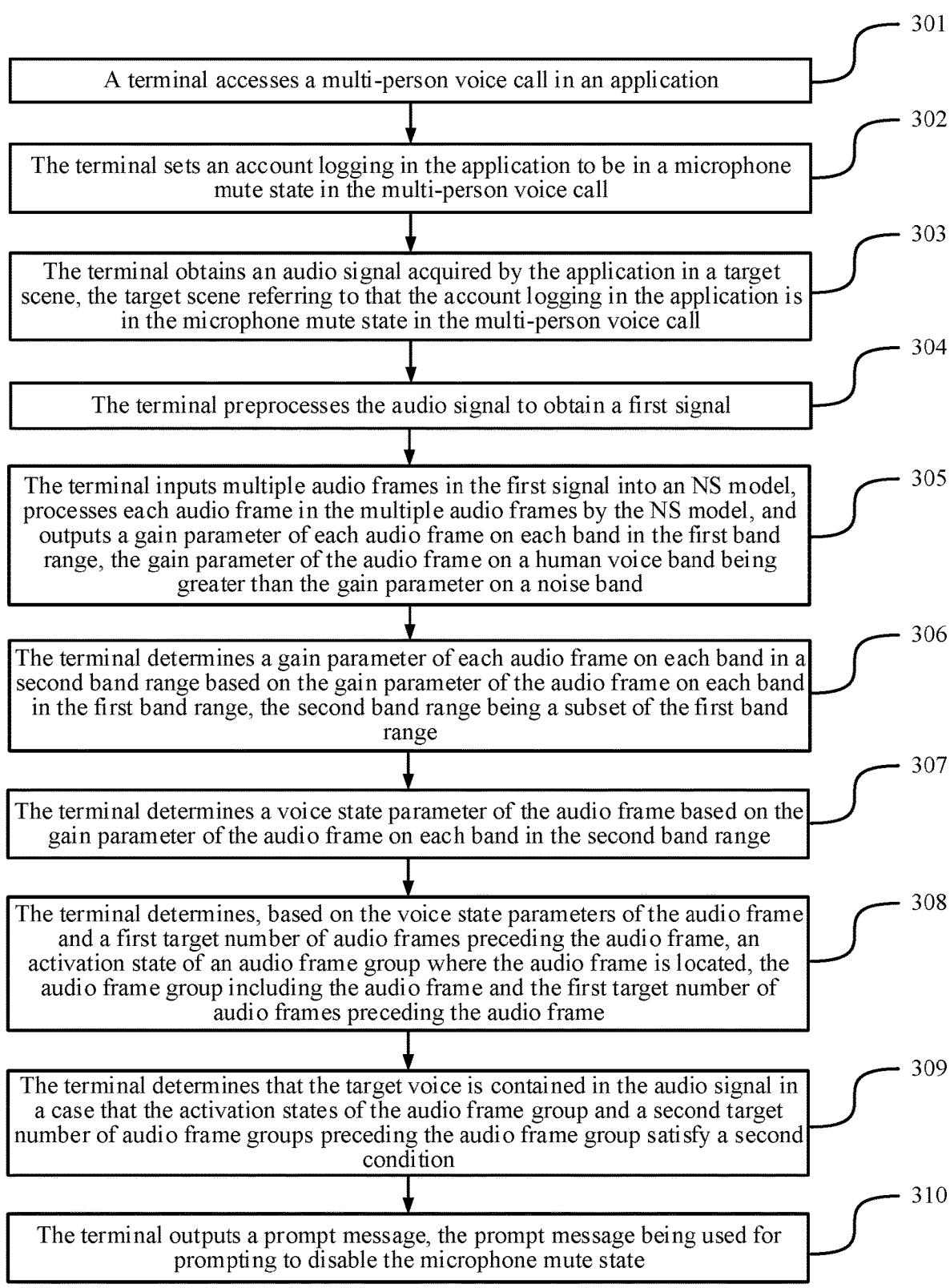

301

A terminal accesses a multi-person voice call in an application

302

The terminal sets an account logging in the application to be in a microphone mute state in the multi-person voice call

303

The terminal obtains an audio signal acquired by the application in a target scene, the target scene referring to that the account logging in the application is in the microphone mute state in the multi-person voice call

304

The terminal preprocesses the audio signal to obtain a first signal

305

The terminal inputs multiple audio frames in the first signal into an NS model, processes each audio frame in the multiple audio frames by the NS model, and outputs a gain parameter of each audio frame on each band in the first band range, the gain parameter of the audio frame on a human voice band being greater than the gain parameter on a noise band

306

The terminal determines a gain parameter of each audio frame on each band in a second band range based on the gain parameter of the audio frame on each band in the first band range, the second band range being a subset of the first band range

307

The terminal determines a voice state parameter of the audio frame based on the gain parameter of the audio frame on each band in the second band range

308

The terminal determines, based on the voice state parameters of the audio frame and a first target number of audio frames preceding the audio frame, an activation state of an audio frame group where the audio frame is located, the audio frame group including the audio frame and the first target number of audio frames preceding the audio frame

309

The terminal determines that the target voice is contained in the audio signal in a case that the activation states of the audio frame group and a second target number of audio frame groups preceding the audio frame group satisfy a second condition

310

The terminal outputs a prompt message, the prompt message being used for prompting to disable the microphone mute state

FIG. 3

AUDIO SIGNAL PROCESSING METHOD AND APPARATUS, ELECTRONIC DEVICE, AND STORAGE MEDIUM WITH MACHINE LEARNING AND FOR MICROPHONE MUTE STATE FEATURES IN A MULTI PERSON VOICE CALL

CROSS-REFERENCE TO RELATED APPLICATIONS

This application is a bypass continuation application of International Patent Application No. PCT/CN2022/111474, filed on Aug. 10, 2022, which is based on and claims priority to Chinese Patent Application No. 202111087468.5, filed on Sep. 16, 2021, with the China National Intellectual Property Administration, the disclosures of each of which are incorporated by reference in its entirety.

FIELD OF THE TECHNOLOGY

This disclosure relates to the technical field of audio, and in particular, to an audio signal processing method and apparatus, an electronic device, and a storage medium.

BACKGROUND OF THE DISCLOSURE

With the development of an audio technology and diversification of terminal functions, voice calls may be made between different terminals based on a voice over Internet protocol (VOIP) technology.

SUMMARY

Embodiments of the disclosure provide an audio signal processing method and apparatus, an electronic device, and a storage medium, which can improve the human-computer interaction efficiency of users in a microphone-off state in a multi-person voice call.

In accordance with certain embodiments of the present disclosure, an audio signal processing method, performed by at least one processor on a terminal, is provided. The method includes obtaining an audio signal acquired by an application while an account logging into the application is in a microphone mute state in a multi-person voice call; obtaining gain parameters, for each of a plurality of audio frames in the audio signal, respectively on a plurality of bands in a first band range; and outputting a prompt message responsive to a determination, based on the gain parameters, that a target voice is contained in the audio signal, the prompt message providing a prompt to disable the microphone mute state of the account.

In accordance with other embodiments of the present disclosure, an audio signal processing apparatus, disposed in a terminal, is provided. The apparatus includes at least one memory configured to store program code, and at least one processor configured to read the program code and operate as instructed by the program code. The program code includes first obtaining code, configured to cause the at least one processor to obtain an audio signal acquired by an application while an account logging into the application is in a microphone mute state in a multi-person voice call; second obtaining code, configured to cause the at least one processor to obtain gain parameters, for each of a plurality of audio frames in the audio signal, respectively on a plurality of bands in a first band range; and output code, configured to cause the at least one processor to output a prompt message responsive to a determination, based on the gain parameters, that a target voice is contained in the audio signal, the prompt message providing a prompt to disable the microphone mute state of the account.

In accordance with still other embodiments of the present disclosure, a non-transitory computer-readable storage medium storing at least one computer program is provided. The at least one computer program is executable by a processor to perform audio signal processing operations of obtaining an audio signal acquired by an application while an account logging into the application is in a microphone mute state in a multi-person voice call; obtaining gain parameters, for each of a plurality of audio frames in the audio signal, respectively on a plurality of bands in a first band range; and outputting a prompt message responsive to a determination, based on the gain parameters, that a target voice is contained in the audio signal, the prompt message providing a prompt to disable the microphone mute state of the account.

BRIEF DESCRIPTION OF THE DRAWINGS

To describe the technical solutions of embodiments of the disclosure more clearly, the following briefly introduces the accompanying drawings for describing certain embodiments.

FIG. 3 is a flowchart of an audio signal processing method according to an embodiment of the disclosure.

DETAILED DESCRIPTION OF EMBODIMENTS

Figure 1:
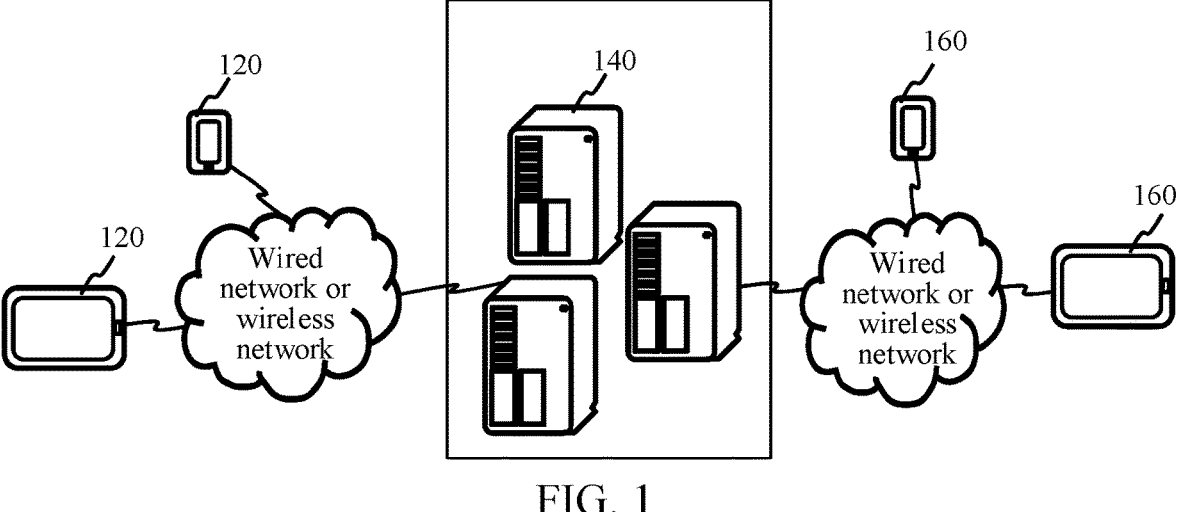
FIG. 1 is a schematic diagram of an implementation environment of an audio signal processing method according to an embodiment of the disclosure.

In a multi-terminal real-time audio-video call scene, a user corresponding to one terminal speaks while users corresponding to multiple terminals is silent, and some users may turn off microphones (or referred to as muting microphones, namely, turning off the microphones of the corresponding terminals) in a silent state, so as to avoid disturbing the speaking user.

In the foregoing scene, if a user who turns off a microphone starts to speak, the user often speaks directly without turning on the microphone again because the user forgets being in a microphone-off state. Since the microphone is still off, an audio signal of the user cannot be acquired and transmitted to other terminals. At this moment, conventionally, the other terminals are required to prompt the user to notice that the user is in a microphone-off state. The user needs to turn on the microphone and then repeat the speech once again, and therefore the human-computer interaction is inefficient in the conventional approach.

Hereinafter, terms involved in embodiments of the disclosure will be explained.

VOIP: VoIP is a voice call technology that achieves voice calls and multimedia conferences via an Internet protocol (IP), namely, via the Internet. Other informal names of VoIP include: IP phone, Internet phone, broadband phone, broadband phone service, and the like. VoIP may be used in many Internet access devices, including VoIP phones, smartphones, and personal computers, so as to perform calls and transmit short messages through cellular networks and wireless fidelity (WiFi).

In the VoIP technology, after coding and compressing an audio signal via an audio compression algorithm, a transmitter device packages the coded and compressed audio signal according to an IP protocol to obtain a voice data packet, and transmits the voice data packet to an IP address corresponding to a receiver device via an IP network. After parsing and decompressing the voice data packet, the receiver device restores the voice data packet to an original audio signal, so as to achieve the purpose of transmitting the audio signal via the Internet.

Voice activity detection (VAD): VAD is also referred to as voice endpoint detection, voice boundary detection, silence suppression, voice activity detection, or the like. The purpose of VAD is to identify and eliminate long silence periods from an audio signal stream, so as to achieve the effect of saving voice channel resources without reducing the quality of service. VAD is an important component of a VoIP phone application, which can save valuable bandwidth resources and help reduce the end-to-end delay perceived by users.

Quadrature mirror filter (QMF): QMF is a group of filters commonly configured to perform band separation on an input signal. For example, the input signal is separated into a high-band signal (referred to as a high-frequency signal) and a low-band signal (referred to as a low-frequency signal). Therefore, the QMF is a common means for subband signal decomposition, and the signal bandwidth can be reduced, whereby each sub-band can be successfully processed by a channel.

According to a spectrum division table formulated by the institute of electrical and electronics engineers (IEEE), a band range of the low-frequency signal is 30-300 kHz, a band range of an intermediate-frequency signal is 300-3000 kHz, a band range of the high-frequency signal is 3-30 MHz, a band range of a very-high-frequency signal is 30-300 MHZ, and a band range of an ultra-high-frequency signal is 300-1000 MHz or higher. Hz, referred to as Hertz, is a physical unit of frequency, kHz is kilohertz, and MHz is megahertz.

Acoustic echo cancellation (AEC): an acoustic echo is caused by multiple feedbacks of the sound of the speaker to the microphone in hands-free or conference applications. In some scenes, an AEC processing method includes: 1) A multi-person call system of terminal A receives an audio signal of terminal B. 2) The audio signal of terminal B is sampled, and this sampling is referred to as an echo cancellation reference signal. 3) Then the audio signal of terminal B is transmitted to a speaker and an acoustic echo canceller of terminal A. 4) The audio signal of terminal B is picked up by a microphone of terminal A together with a human voice emitted by a user corresponding to terminal A. 5) The signal picked up by the microphone is transmitted to the acoustic echo canceller for comparison with the originally sampled reference signal to remove the reference signal (namely, the audio signal of terminal B) from the signal picked up by the microphone for AEC purposes.

Noise suppression (NS): an NS technology is used for eliminating a background noise in the audio signal, improving the signal-to-noise ratio and intelligibility of the audio signal, and making human beings and machines hear clearly. Single-channel NS is usually composed of two parts: noise estimation and gain factor estimation.

Recurrent neural network (RNN): RNN is a recurrent neural network with sequence data as input, recursion in the direction of sequence evolution and all nodes (recurrent units) connected in a chain. For example, an audio frame sequence of the audio signal is a typical type of sequence data. RNN has memory, parameter sharing, and Turing completeness, and thus has some advantages in learning nonlinear features of the sequence data. RNN is applied in the fields of natural language processing (NLP), such as NS, voice processing, voice recognition, language modeling, or machine translation, and is also used for various types of time sequence prediction.

Automatic gain control (AGC): AGC refers to an automatic control method that allows the gain of an amplification circuit to be automatically adjusted with signal strength. The definition of AGC is consistent with automatic level control (ALC), but AGC and ALC have different mechanisms of action. ALC refers to increasing an input signal level and improving the ability of a repeater to control an output signal level when the repeater works at a maximum gain and outputs maximum power. Comparatively speaking. ALC controls the output signal level by feedback control of the strength of the input signal, and AGC controls the output signal level by feedback control of the gain of the repeater.

Gain parameter (Gain): the gain parameter is also referred to as a gain value, and the general meaning of the gain is an amplification factor or an amplification rate in short. In an audio system, the gain of amplification is generally determined by an input level of a signal source. The gain parameter involved in various embodiments of the disclosure refers to an amplification rate on each band within a given first band range predicted by an NS model when NS is performed on each audio frame, and the purpose of NS is to amplify human voice and reduce noise. Therefore, the gain parameter of each audio frame on a human audio band is greater than the gain parameter on a noise band. Optionally, the gain parameter is a value greater than or equal to 0 and less than or equal to 1.

Energy parameter: also referred to as an energy value, the energy parameter of an audio frame being used for representing a signal amplitude of the audio frame.

FIG. 1 is a schematic diagram of an implementation environment of an audio signal processing method according to an embodiment of the disclosure. Referring to FIG. 1, a first terminal 120, a server 140, and a second terminal 160 are included in the implementation environment.

An application supporting a multi-person voice call is installed and run in the first terminal 120. The multi-person voice call includes a multi-person audio call or a multi-person video call based on a VoIP technology. Optionally, the application includes, but is not limited to, a social application, an enterprise application, an IP phone application, a teleconference application, a telemedicine application, a call application, and the like. The type of the application is not limited in this embodiment of the disclosure.

The first terminal 120 and the second terminal 160 are directly or indirectly communicatively connected to the server 140 through a wired or wireless communication manner.

The server 140 includes at least one of a server, multiple servers, a cloud computing platform, or a virtualization center. The server 140 is configured to provide a background service for the application supporting the multi-person voice call. Optionally, the server 140 undertakes primary computing tasks, and the first terminal 120 and the second terminal 160 undertake secondary computing tasks. Or, the server 140 undertakes secondary computing tasks, and the first terminal 120 and the second terminal 160 undertake primary computing tasks. Or, the server 140, the first terminal 120, and the second terminal 160 perform cooperative computing using a distributed computing architecture.

Optionally, the server 140 is an independent physical server, a server cluster or a distributed system composed of multiple physical servers, or a cloud server providing basic cloud computing services, such as a cloud service, a cloud database, cloud computing, a cloud function, cloud storage, a network service, cloud communication, a middleware service, a domain name service, a security service, a content delivery network (CDN), and big data and artificial intelligence platforms.

An application supporting a multi-person voice call is installed and run in the second terminal 160. The multi-person voice call includes a multi-person audio call or a multi-person video call based on a VoIP technology. Optionally, the application includes, but is not limited to, a social application, an enterprise application, an IP phone application, a teleconference application, a telemedicine application, a call application, and the like. The type of the application is not limited in this embodiment of the disclosure.

In a two-person voice call scene, the first terminal 120 is a terminal used by a first user. The first user initiates a social application on the first terminal 120. The first user logs in a first account in the social application, and triggers, based on a call option in a chat interface with a second account, the first terminal 120 to transmit a call request aiming at a second account to the server 140. The call request is used for requesting the second account to join a two-person voice call. The server 140 forwards the call request to the second terminal 160 in which the second account logs. If the second account agrees to join the two-person voice call, the first terminal 120 and the second terminal 160 can perform online voice communication based on the VoIP technology. Here, two terminals perform a multi-person voice call. This embodiment of the disclosure is also applicable to a three-or-more-person voice call scene, which will not be described in detail herein. In the two-person voice call scene, if the first user or the second user does not want to speak for a while, microphones can be turned off for the corresponding account (or referred to as muting microphones, namely, turning off the microphones of the corresponding terminals) at any time in a call interface of the social application, so as to avoid making noise in the two-person voice call and affecting the call quality.

In a multi-person teleconference scene, the first terminal 120 is a terminal used by a conference moderator. The conference moderator starts a teleconference application on the first terminal 120, creates a new network conference, and specifies start time of the network conference. The server

140 assigns a conference number to the network conference. After reaching the start time of the network conference, the conference moderator inputs the conference number in the teleconference application to access the network conference. Similarly, the second terminal 160 is a terminal used by any participant in the network conference. Participants enter the conference number in the teleconference application to access the network conference. In general, during the online conference, the conference moderator is required to speak. In this case, the participants turn off microphones for the corresponding accounts, thereby preventing disturbing the speech of the conference moderator.

Optionally, the applications installed on the first terminal 120 and the second terminal 160 are the same, or the applications installed on the two terminals are the same type of applications on different operating system platforms, or the applications installed on the two terminals are different versions of the same type of applications developed for different models of terminals. For example, if the first terminal 120 is a desktop computer, a personal computer (PC) application is installed. If the second terminal 160 is a smartphone, a mobile terminal application is installed.

The first terminal 120 may generally refer to one of multiple terminals, and the second terminal 160 may generally refer to another of the multiple terminals. This embodiment of the disclosure is exemplified only by the first terminal 120 and the second terminal 160. The first terminal 120 and the second terminal 160 have the same or different device types. The device types include: at least one of a smartphone, a tablet personal computer, a smart speaker, a smart watch, a laptop computer, or a desktop computer, but is not limited thereto. For example, the first terminal 120 may be a desktop computer and the second terminal 160 may be a smartphone, or both the first terminal 120 and the second terminal 160 may be smartphones or other handheld portable communication devices.

A person skilled in the art may know that the number of the foregoing terminals may be larger or smaller. For example, there may be only one terminal, or there may be tens or hundreds of terminals, or more terminals. This embodiment of the disclosure does not limit the number of terminals and device types.

Based on the foregoing implementation environment, in an audio-video communication system, especially in a multi-person voice call (such as a multi-person real-time audio-video call or a multi-person remote conference) scene, there is often a situation where one person speaks and multiple persons are silent, and some users may turn off microphones in a silent state so as not to disturb the speaking user. If a user who turns off a microphone starts to speak, the user often speaks directly without turning on the microphone again (namely, without disabling a microphone-off state) because the user forgets being in the microphone-off state. Since the microphone is still off, an audio signal of the user cannot be acquired and transmitted to other terminals. At this moment, the user cannot be responded by other users in view of speaking in a multi-person voice call. If the user has not found being in the microphone-off state, the user will notice being in the microphone-off state only after being prompted by other users, and the user will repeat the just speech once again after turning on the microphone. Therefore, the human-computer interaction is inefficient, and the user experience is seriously affected.

In view of the foregoing situation, embodiments of the disclosure provide an audio signal processing method. If a user sets a corresponding account to be in a microphone mute state in a multi-person voice call. In the microphone mute state, an application on a terminal can still acquire an audio signal of the user via a microphone, but does not transmit the acquired audio signal to other accounts participating in the multi-person voice call. The application determines whether a target voice is contained in the audio signal by performing signal analysis and processing on the audio signal acquired by the microphone, and using gain parameters of multiple audio frames in the audio signal respectively on multiple bands in a first band range. If the target voice is contained in the audio signal, it is indicated that the user starts to speak without disabling the microphone mute. Therefore, a prompt message is outputted to prompt the user to disable the microphone mute state. Otherwise, if the audio signal does not contain the target voice, it is represented that a noise ratio in the audio signal is high, and it is indicated that the user does not speak or the user is chatting (rather than wanting to actively speak in the multi-person voice call). Therefore, there is no need to make any prompt.

Figure 2:
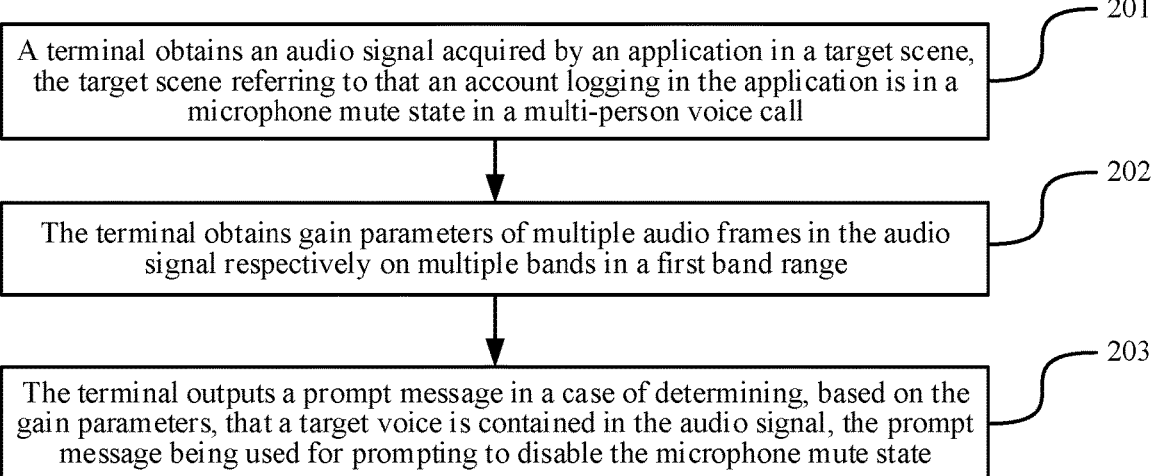
FIG. 2 is a flowchart of an audio signal processing method according to an embodiment of the disclosure.

FIG. 2 is a flowchart of an audio signal processing method according to an embodiment of the disclosure. Referring to FIG. 2, this embodiment is performed by an electronic device, and describes an example where the electronic device is a terminal. The terminal refers to any terminal participating in a multi-person voice call, such as the first terminal 120 or the second terminal 160 in the foregoing implementation environment. The detailed description is as follows:

201: A terminal obtains an audio signal acquired by an application in a target scene, the target scene referring to that an account logging in the application is in a microphone mute state in a multi-person voice call.

The terminal is an electronic device used by any user participating in a multi-person voice call, and an application supporting the multi-person voice call is installed and run on the terminal. An account logs in the application, and the target scene refers to that the account is in a microphone mute state in the multi-person voice call. Optionally, the application includes, but is not limited to, a social application, an enterprise application, an IP phone application, a teleconference application, a telemedicine application, a call application, and the like. The type of the application is not limited in this embodiment of the disclosure.

In some embodiments, the application varies depending on the device type of the terminal. For example, if the terminal is a laptop computer or a desktop computer, the application is a PC application. If the terminal is a smartphone, the application is a mobile application. This embodiment of the disclosure is not limited thereto.

202: The terminal obtains gain parameters of multiple audio frames in the audio signal respectively on multiple bands in a first band range.

In some embodiments, the terminal preprocesses the audio signal to obtain a first signal, inputs multiple audio frames in the first signal into an NS model, processes each audio frame in the multiple audio frames through the NS model, and outputs a gain parameter of each audio frame on each band in the first band range. The gain parameter of the audio frame on a human voice band is greater than the gain parameter on a noise band.

In the foregoing process, the gain parameter of each audio frame in the multiple audio frames on each band within the first band range is determined. Since a higher gain parameter will be allocated to the human voice band than the noise band in the NS process, so as to achieve the effect of effectively enhancing a human voice component in the audio signal and suppressing a noise component in the audio signal, the gain parameter of each audio frame on each band can help to identify whether a target voice is contained in each audio frame, thereby determining whether the target voice is contained in the entire audio signal.

203: The terminal outputs a prompt message in a case of determining, based on the gain parameters, that a target voice is contained in the audio signal, the prompt message being used for prompting to disable the microphone mute state.

The prompt information is used for prompting to disable the microphone mute state of the foregoing account. The target voice is a speech of a target object in the multi-person voice call. Or, the target voice is a sound of the target object. The target object refers to a user participating in the multi-person voice call through this terminal.

In some embodiments, if the target voice is a speech of the target object in the multi-person voice call, the prompt message is outputted externally only if it is detected that the speech of the target object in the multi-person voice call is included in the audio signal. If only the sound of the target object is contained in the audio signal but the sound is not a speech in the multi-person voice call, it is indicated that the user is chatting, but it is likely that the content of the chatting is not intended to be transmitted in the multi-person voice call, or the sound of the target object is not contained in the audio signal, it is indicated that the user has not made a sound but may have acquired some background noise. In both cases, the prompt message is not outputted externally. Time when the user wants to speak in the multi-person voice call can be identified with high precision, and the prompt message is outputted at this moment, so as to avoid the disturbance caused by outputting the prompt message to the user when the user is chatting.

In some embodiments, if the target voice is the sound of the target object, the prompt message is outputted externally upon detecting that the sound of the target object is included in the audio signal. If the sound of the target object is not contained in the audio signal, the prompt message is not outputted externally. In this way, the detection sensitivity for the sound of the target object can be improved, and the occurrence of the following scene can be avoided: The user says a short sentence but may be determined to be chatting by a machine so as not to prompt, thereby improving the detection sensitivity for the sound of the target object.

In some embodiments, the terminal can determine whether the target voice is contained in the audio signal based on the gain parameter of each audio frame on each band. If the target voice is contained, it is represented that the user starts to speak in the microphone mute state, resulting in invalid communication. Then the prompt message is outputted to prompt the user to disable the microphone mute state. If the target voice is not contained, it is represented that the user does not start to speak or is chatting (rather than actively speaking in the multi-person voice call), and therefore the microphone mute state is still maintained without any prompt.

In some embodiments, when it is determined whether the target voice is contained in the audio signal, the terminal performs a judgment based on the gain parameter of each audio frame on each band, namely, performs a VAD decision on the gain parameter outputted by each audio frame based on the NS model, so as to determine whether the target voice is contained in the audio signal, thereby simplifying the VAD decision flow and shortening the VAD decision duration.

The foregoing manner is generally more suitable for a scene where the target voice is the sound of the target object, and where an embodiment may simply determine whether the sound of the target object is contained in the audio signal. By using the gain parameter of each audio frame on each band, it can be better determined whether the sound of the target object is contained in the audio signal. Certainly, the foregoing manner may also be used in the scene where the target voice is the speech of the target object in the multi-person voice call. Since continuous sound fluctuations will not usually occur during chatting, an embodiment may set only the condition of the VAD decision to be stricter. For example, an embodiment may determine that the target voice is contained in the audio signal only when voice activity parameters of multiple consecutive audio frames, namely, VAD values are 1. This embodiment of the disclosure is not limited thereto.

In some embodiments, when it is determined whether the target voice is contained in the audio signal, the terminal performs a comprehensive judgment in combination with the gain parameter of each audio frame on each band and the energy parameter of each audio frame, namely, performs a VAD decision on the gain parameter outputted by each audio frame and the energy parameter of each audio frame based on the NS model, so as to determine whether the target voice is contained in the audio signal. Due to the introduction of impact factors in two dimensions: gain parameters and energy parameters, it can be more accurately identified whether the target voice is contained in the audio signal, thereby improving the accuracy of VAD decision.

The foregoing manner is generally more suitable for a scene where the target voice is the speech of the target object in the multi-person voice call. The sound of the target object may be identified in the audio signal, and an embodiment may further determine whether the sound of the target object is from chatting or speaking. It is considered that the volume of the target object when speaking is large, namely, a signal when speaking has not only a VAD value of 1 but also a large energy parameter, while the volume when chatting is small, namely, a signal when chatting has only a VAD value of 1 but a small energy parameter. Therefore, the two dimensions: gain parameters and energy parameters are combined to make a comprehensive decision, whereby it can be better determined whether the speech of the target object in the multi-person voice call is contained in the audio signal. Certainly, the foregoing manner may also be used for a scene where the target voice is the sound of the target object, whereby some audio signals with a VAD value of 1 but a smaller energy parameter (for example, further away from the microphone) can be accurately detected, thereby improving the accuracy of the VAD decision.

In some embodiments, when it is determined whether the target voice is contained in the audio signal, the terminal performs NS on each audio frame based on the gain parameter of each audio frame on each band to obtain each noise-suppressed target audio frame, calculates an energy parameter of each target audio frame, and performs VAD on the energy parameter of each target audio frame using a VAD algorithm to determine whether the target voice is contained in the audio signal, whereby it can also be accurately identified whether the target voice or noise is contained in the audio signal, thereby improving the accuracy of VAD decision.

The foregoing manner is also applicable to a scene where the target voice is the speech of the target object in the multi-person voice call, or the target voice is the sound of the target object, in which an embodiment may adjust training data only when iteratively training the VAD algorithm according to the difference of the target voice to be prompted, thus having a high portability and degree of migration, and having a high availability and a wide range of application scenes.

In some embodiments, the terminal is adapted based on the difference of terminal types when outputting the prompt message. If the terminal is a non-mobile terminal device such as a personal computer or a laptop computer, the terminal outputs the prompt message at a desktop end. If the terminal is a mobile terminal device, the terminal outputs the prompt message at the mobile end, whereby different types of terminals are compatible.

In some embodiments, the terminal only outputs the prompt message externally, and the user manually disables the microphone mute state, so as to ensure the autonomy of the user in controlling whether to disable the microphone mute state. In some embodiments, in a case of detecting that the target voice is contained in the audio signal, the terminal automatically disables the microphone mute state and externally indicates that the microphone mute state has been disabled, without requiring the user to manually disable the microphone mute state, thereby reducing the complexity of user operation.

In some embodiments, an output manner of the prompt message includes, but is not limited to, a text form output, a voice form output, an animation form output, a dynamic effect form output, and the like. The output manner of the prompt message is not limited in this embodiment of the disclosure.

In some embodiments, the terminal displays a text prompt message in a call interface of the multi-person voice call. The text prompt message is used for prompting the user to disable the microphone mute state. For example, the text prompt message is "You have turned microphone off, please speak after turning it on". Optionally, the text prompt message pops up in the call interface in the form of pop-up windows, or the text prompt message emerges in the call interface in the form of floating layers, or the text prompt message scrollably displays or blinks in the call interface in the form of captions. The display manner of the text prompt message is not limited in this embodiment of the disclosure. Optionally, the text prompt message automatically disappears after being displayed in the call interface for a period of time, or the text prompt message continues to be displayed in the call interface until the user manually closes the text prompt message. The closing manner of the text prompt message is not limited in this embodiment of the disclosure.

In some embodiments, the terminal plays a voice prompt message externally. The voice prompt message is used for prompting the user to disable the microphone mute state. For example, the voice prompt message is "You have turned microphone off, please speak after you turn it on".

In some embodiments, the terminal plays an animation prompt message or a dynamic effect prompt message in the call interface of the multi-person voice call. The animation prompt message or the dynamic effect prompt message is used for prompting the user to disable the microphone mute state. Optionally, the animation prompt message or the dynamic effect prompt message automatically disappears after being played once in the call interface, or the animation prompt message or the dynamic effect prompt message is played circularly in the call interface until the user manually closes the animation prompt message or the dynamic effect prompt message. The closing manner of the animation prompt message or the dynamic effect prompt message is not limited in this embodiment of the disclosure.

The foregoing optional technical solutions can be combined in any form to form optional embodiments of the present disclosure, and will not be described in detail herein.

According to the method provided in this embodiment of the disclosure, an application still acquires an audio signal of a user in a case of being in a microphone mute state in a multi-person voice call, but does not transmit the acquired audio signal to other accounts participating in the multi-person voice call. The application performs signal analysis and processing on the audio signal, and determines whether a target voice is contained in the audio signal by using gain parameters of multiple audio frames in the audio signal respectively on multiple bands in a first band range. If the target voice is contained in the audio signal, it is indicated that the user starts to speak without disabling the microphone mute state, so as to output a prompt message externally, thereby prompting the user to disable the microphone mute state in time, reducing the loss of communication efficiency caused by the user having not found that the microphone is mute, improving the human-computer interaction efficiency, and optimizing user experience.

FIG. 3 is a flowchart of an audio signal processing method according to an embodiment of the disclosure. Referring to FIG. 3, this embodiment is performed by an electronic device, and describes an example where the electronic device is a terminal. The terminal refers to any terminal participating in a multi-person voice call, such as the first terminal 120 or the second terminal 160 in the foregoing implementation environment.

In this embodiment of the disclosure, it will be described in detail how the terminal determines whether the target voice is contained in the audio signal based on the gain parameter of each audio frame on each band, namely, performs a VAD decision on the gain parameter outputted by each audio frame based on the NS model. This embodiment includes the following operations:

301: A terminal accesses a multi-person voice call in an application.

The multi-person voice call includes a multi-person audio-video call based on a VoIP technology, such as a multi-person audio call, a multi-person video call, some users accessing in an audio call manner, or some users accessing in a video call manner. The type of the multi-person voice call is not limited in this embodiment of the disclosure. Optionally, the multi-person voice call includes: a two-person real-time audio-video call (such as a two-person voice call or a two-person video call) initiated to a specified account based on a social application, or a multi-person real-time audio-video call (such as a multi-person voice call or a multi-person video call) initiated within a specified account group based on a social application, or a multi-person remote conference (such as a multi-person voice conference or a multi-person video conference) initiated based on a conference application, and the like.

In some embodiments, a user starts an application on the terminal that supports the multi-person voice call. For example, the starting operation is that the user performs a touch operation on an icon of the application on a desktop of the terminal, or the user inputs a starting instruction for the application to an intelligent assistant. The starting instruction includes a voice instruction or a text instruction. The type of the starting instruction is not limited in this embodiment of the disclosure. Optionally, when the user sets an automatic starting condition for the application, upon detecting the automatic starting condition satisfying the application by the terminal, an operating system automatically starts the application. For example, the automatic starting condition is automatic start-up, or timed automatic start, such as automatically starting the application 5 minutes before the start of a specified conference. The automatic starting condition of the application is not limited in this embodiment of the disclosure.

After the application is started, a main interface of the application is displayed. An account login option is displayed in the main interface. The user performs a triggering operation on the account login option, logs in the account of the user in the application, and returns to the main interface after login is completed. In some embodiments, the user accesses the multi-person voice call based on the application after the account login is completed. The terminal displays a call interface of the multi-person voice call. Each account accessing the multi-person voice call and a microphone setting control are displayed in the call interface. The microphone setting control is configured to enable or disable a microphone mute state of this account in the multi-person voice call.

In some embodiments, in a multi-person real-time audio-video call scene, a manner in which a user accesses the multi-person voice call includes: displaying, in response to receiving a call request of a target account, a call request interface in the application. Optionally, the call request interface displays an avatar picture, an answer option, and a hang-up option of the target account. The user performs a triggering operation on the answer option, namely, accesses the multi-person voice call. Optionally, the target account is an initiator account of the multi-person voice call, and then the corresponding scene is that an initiator initiates a call request to the user. Or, the target account is any participant account which has accessed the multi-person voice call, and then the corresponding scene is that the participant invites the user to join the multi-person voice call. This embodiment of the disclosure is not limited thereto.

In some embodiments, in a multi-person conference scene, a manner in which a user accesses the multi-person voice call includes: The user inputs a conference number of a target conference in a conference search box of the application to query and display the target conference corresponding to the conference number. The user may access the multi-person voice call by clicking/tapping a conference entry option of the target conference. Or, in a case that the user has collected or marked a target conference and starts a conference reminding function for the target conference, if the user starts the application within a target time period before the start of the target conference (for example, 5 minutes before the start), the application automatically pops up conference start reminding information of the target conference and a conference entry option, and the user may access the multi-person voice call by clicking/tapping the conference entry option of the target conference.

In some embodiments, for different types of multi-person voice calls, the display manners of the respective accounts accessing the multi-person voice call are also different in the call interface. For example, in a multi-person audio call, respective avatar pictures of various accounts are displayed in the call interface. In a multi-person video call, respective video streams of various accounts are displayed in the call interface. In a multi-person conference, a conference theme and a presentation file (e.g. a Microsoft PowerPoint™ file or similar) imported by a conference speaker are displayed in the call interface.

302: The terminal sets an account logging in the application to be in a microphone mute state in the multi-person voice call.

The terminal displays a microphone setting control in the call interface. An enable state of the microphone setting control corresponds to a microphone on state, and a disable state of the microphone setting control corresponds to a microphone mute state. If the account is currently in the microphone mute state, namely, the microphone setting control is currently in the disable state, when the user clicks/taps the microphone setting control, the terminal switches the microphone setting control from the disable state to the enable state, namely, the microphone mute state may be disabled. If the account is currently in the microphone on state, namely, the microphone setting control is currently in the enable state, when the user clicks/taps the microphone setting control, the terminal switches the microphone setting control from the enable state to the disable state, namely, the microphone mute state may be enabled, and the following operation 303 is performed.

303: A terminal obtains an audio signal acquired by an application in a target scene, the target scene being that an account logging in the application is in a microphone mute state in a multi-person voice call.

In some embodiments, the target scene is satisfied when the user sets the microphone setting control to the disable state in the call interface whereby the account is in the microphone mute state in the multi-person voice call. In the microphone mute state involved in this embodiment of the disclosure, the terminal does not turn off a microphone, but still invokes the microphone to acquire an audio signal without transmitting the audio signal to other accounts participating in the multi-person voice call.

In some embodiments, the terminal acquires the audio signal as follows. The terminal invokes an application programming interface (API) via the application, and drives the microphone to acquire the audio signal based on the API.

304: The terminal preprocesses the audio signal to obtain a first signal.

The manner in which the terminal preprocesses the audio signal includes, but is not limited to, at least one of framing, windowing, Fourier transform, band separation, or AEC. The manner of preprocessing is not limited in this embodiment of the disclosure.

In some embodiments, the terminal performs natural framing on the audio signal to obtain multiple first audio frames, namely, completes framing processing on the audio signal.

In some embodiments, the terminal re-frames the audio signal on the basis of natural framing to obtain multiple second audio frames. Optionally, the re-framing manner includes: the terminal performs windowing processing on the multiple first audio frames to obtain the multiple second audio frames. The second audio frames are first audio frames divided by a limited time. The limited time is any duration greater than or equal to 0.

In some embodiments, the terminal inputs the multiple first audio frames into a window function, and divides the multiple first audio frames into the multiple second audio frames of equal duration by moving the window function in the time domain of the multiple first audio frames, namely, re-frames the multiple first audio frames to obtain the multiple second audio frames. Optionally, the window function includes, but is not limited to, a hamming window, a hanging window, or a rectangular window. The type of the window function is not limited in this embodiment of the disclosure.

In some embodiments, the multiple second audio frames have an overlap rate of a target ratio. That is, a step size of moving the window function in the time domain is less than 1. The target ratio is any value greater than 0. For example, when the step size is 0.6, the overlap rate of adjacent second audio frames divided by the window function is 40%. By setting a certain overlap rate, the loss of edge time domain features of each second audio frame intercepted by the window function due to random errors or system errors in the windowing process can be avoided.

In some embodiments, the terminal performs Fourier transform on the audio signal on the basis of windowing processing to obtain multiple third audio frames. Optionally, since each of the second audio frames divided by the window function can be considered as a stationary signal, the terminal performs Fourier transform on the multiple second audio frames to obtain the multiple third audio frames. That is, the audio signal can be converted from the time domain to the frequency domain to complete time-frequency conversion on the audio signal.

Optionally, the manner in which each second audio frame is subjected to Fourier transform includes, but is not limited to, fast Fourier transform (FFT), short-time Fourier transform (STFT), discrete cosine transform (DCT), and the like. The manner of the Fourier transform is not limited in this embodiment of the disclosure.

In some embodiments, the terminal performs different processing on audio signals with different sampling rates on the basis of time-frequency conversion. Optionally, the terminal obtains a sampling rate of the audio signal. If the sampling rate is greater than a sampling rate threshold, the audio signal is determined as a super-definition signal. The terminal performs band separation on the super-definition signal, separates a low-frequency signal and a high-frequency signal in the super-definition signal, and performs a subsequent VAD decision only on the low-frequency signal, whereby the computing amount of the VAD decision can be reduced. However, the terminal does not need to perform band separation on non-super-definition signals (such as high-definition signals), and directly performs a subsequent VAD decision on the overall audio signal, whereby the processing flow of the audio signal can be simplified.

In some embodiments, the manner in which the terminal performs band separation on the super-definition signal with the sampling rate greater than the sampling rate threshold includes: inputting the multiple third audio frames after Fourier transform into a QMF analysis filter, and filtering the multiple third audio frames based on the QMF analysis filter to respectively output a high-frequency component and a low-frequency component in the multiple third audio frames. The high-frequency component obtained by filtering is the high-frequency signal in the audio signal, and the low-frequency component obtained by filtering is the low-frequency signal in the audio signal. For example, according to a spectrum division table formulated by the IEEE, a band range of the low-frequency signal is 30-300 kHz, a band range of an intermediate-frequency signal is 300-3000 kHz, and a band range of the high-frequency signal is 3-30 MHZ.

In a real-time scene, assuming that the audio signal acquired by the microphone is 16 kHz of bandwidth data, after performing band separation through the QMF analysis filter, 8 kHz of high-frequency signal and 8 kHz of low-frequency signal are outputted, and the subsequent NS and VAD decision only act on the 8 kHz of low-frequency signal, whereby the computing amount of NS and VAD decision can be reduced.

It is to be noted that the foregoing band separation is an optional operation in preprocessing. For example, band separation is performed only for a super-definition signal, but band separation is not required for a non-super-definition signal. This embodiment of the disclosure does not limit whether audio signals are subjected to band separation.

In some embodiments, the terminal performs AEC on the low-frequency signal obtained by band separation for the super-definition signal or on the non-super-definition signal to cancel an acoustic echo in the low-frequency signal or the non-super-definition signal, so as to improve the accuracy of subsequent NS and VAD decision. Optionally, the terminal inputs the low-frequency signal or the non-super-definition signal into an acoustic echo canceller, and cancels the acoustic echo in the low-frequency signal or the non-super-definition signal through the acoustic echo canceller to obtain the preprocessed first signal.

It is to be noted that the foregoing AEC is an optional operation in the preprocessing. For example, in a case of detecting that the terminal enables a hands-free state in the multi-person voice call, since the audio signals emitted by other terminals in the hands-free state will be acquired by the microphone of this terminal so as to form an acoustic echo, it is preferable to perform AEC on the audio signal so as to improve the accuracy of the subsequent NS and VAD decision. In a case of detecting that the terminal disables the hands-free state in the multi-person voice call, it means that either the user answers the multi-person voice call through an earphone while no acoustic echo is formed, or the user answers the multi-person voice call through a receiver directly in a non-hands-free state while the effect of the acoustic echo is small. Then there is no need to perform AEC on the audio signal, so as to reduce the computing amount of processing of the audio signal. For another example, in a case of detecting that the terminal is not provided with an acoustic echo canceller, no AEC is performed on the audio signal. This embodiment of the disclosure does not limit whether audio signals are subjected to AEC.

The first signal refers to the preprocessed audio signal, and the foregoing process is exemplified by performing both band separation and AEC. In some embodiments, if band separation and AEC are not performed, a frequency domain signal obtained by time-frequency conversion is the first signal. If band separation instead of AEC is performed, a low-frequency signal obtained by band separation is the first signal. If AEC instead of band separation is performed, the first signal is obtained after the AEC. This embodiment of the disclosure is not limited thereto.

305: The terminal inputs multiple audio frames in the first signal into an NS model, processes each audio frame in the multiple audio frames by the NS model, and outputs a gain parameter of each audio frame on each band in the first band range, the gain parameter of the audio frame on a human voice band being greater than the gain parameter on a noise band.

In some embodiments, the multiple audio frames refer to all the audio frames contained in the first signal, or the multiple audio frames refer to a part of the audio frames in the first signal. For example, multiple key frames in the first signal are extracted as the multiple audio frames, or an audio frame is sampled for the first signal at an interval of a preset step size, and multiple audio frames obtained by sampling are taken as the multiple audio frames. The preset step size refers to any integer greater than or equal to 1.

In some embodiments, the terminal obtains a gain parameter of each audio frame in the multiple audio frames on each band in a first band range. The first band range includes at least a human voice band. Optionally, the first band range further includes a noise band in addition to the human voice band.

Optionally, the multiple bands divided in the first band range may be set by a person skilled in the art, and the bands in the first band range may be equally divided into a specified number. The band division manner of the first band range is not limited in this embodiment of the disclosure.

In some embodiments, the first band range is a band range set by a technician or is a default band range set by the system. For example, the first band range is 0-8000 Hz, or the first band range is 0-20000 Hz. The first band range is not limited in this embodiment of the disclosure.

In some embodiments, the NS model is a machine learning model trained on sample data. Optionally, the structure of the NS model includes, but is not limited to, an RNN, a long short-term memory (LSTM), a gate recurrent unit (GRU), convolutional neural networks (CNN), and the like. The structure of the NS model is not limited in this embodiment of the disclosure.

In an implementation scene, the NS model is the RNN for NS. The RNN inputs multiple audio frames in a preprocessed audio signal, namely, a first signal, and outputs multiple gain parameters of each audio frame. The RNN includes at least one hidden layer. Each hidden layer includes multiple neurons. The number of neurons in each hidden layer is the same as the number of inputted audio frames. The neurons in each hidden layer are connected, and adjacent hidden layers are connected in series. For each neuron in each hidden layer, frequency features outputted by a previous neuron in a current hidden layer and a neuron at a corresponding position in a previous hidden layer are used as inputs of this neuron.

Based on the foregoing RNN structure, the terminal inputs the multiple audio frames in the first signal into at least one hidden layer of the RNN, namely, respectively inputs the multiple audio frames into the multiple neurons in the first hidden layer of the RNN. One neuron corresponds to one audio frame. For an $i^{th}$ ($i \geq 1$) neuron in the first hidden layer, frequency features outputted by an $i-1^{th}$ neuron in the first hidden layer and an $i^{th}$ audio frame are used as inputs, the frequency feature outputted by the $i-1^{th}$ neuron in the first hidden layer and the $i^{th}$ audio frame are weighted, and the obtained frequency features are inputted into an $i+1^{th}$ neuron in the first hidden layer and an $i^{th}$ neuron in the second hidden layer. By analogy, through any neuron in any hidden layer in the RNN (which may be termed a present neuron and a present hidden layer, respectively), a frequency feature outputted by a previous neuron in this hidden layer (which may be termed a first frequency feature) and a frequency feature outputted by a neuron at a corresponding position in a previous hidden layer (which may be termed a second frequency feature) are weighted, and the frequency features obtained by weighting are inputted to a next neuron in this hidden layer and a neuron at a corresponding position in a next hidden layer respectively. Finally, respective target frequency features are inputted for each audio frame via the last hidden layer, and softmax (exponential normalization) processing is performed on the target frequency features of each audio frame to predict multiple gain parameters for each audio frame respectively. Each gain parameter corresponds to a band in the first band range.

Due to the larger voice energy in the human voice band, the signal-to-noise ratio is higher. The NS model using the foregoing RNN architecture can accurately recognize noise and human voice after training. Thus, a larger gain parameter is allocated to the human voice and a smaller gain parameter is allocated to the noise, whereby the NS model has a high identification accuracy against non-steady-state noise such as keyboard sounds. Compared with the CNN based on complex convolution, the RNN can satisfy the real-time call scene with a lower computing cost and does not consume too many computing resources to affect the call quality.

Figure 4:
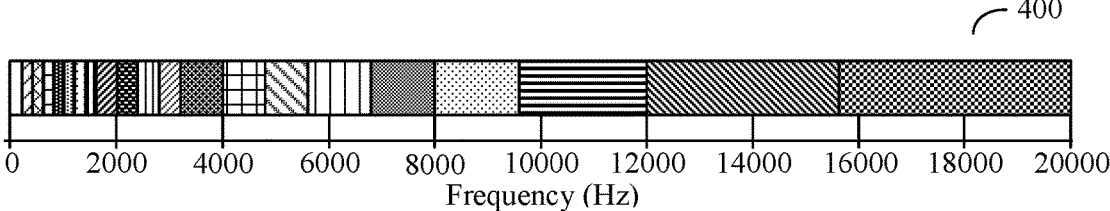
FIG. 4 is an Opus band diagram according to an embodiment of the disclosure.

FIG. 4 is an Opus band diagram according to an embodiment of the disclosure. A band diagram 400 is divided based on an Opus coding manner. Opus is a lossy sound coding format. For example, 0-8000 Hz in the Opus band diagram is used as a first band range and a band division manner in the Opus band diagram is used as a reference. The first band range of 0-8000 Hz is divided into 18 bands. Each point represents a band value. 18 band values of 0-8000 Hz include: 0, 200, 400, 600, 800, 1000, 1200, 1400, 1600, 2000, 2400, 2800, 3200, 4000, 4800, 5600, 6800, and 8000. The band values are in Hz. After the terminal inputs the multiple audio frames in the first signal into the RNN, the RNN outputs 18 gain parameters for each audio frame. Each gain parameter corresponds to a band of 0-8000 Hz in the Opus band diagram.

In operations 304-305, the terminal acquires, for multiple audio frames in the audio signal, gain parameters of the multiple audio frames respectively on the multiple bands in the first band range. Since a higher gain parameter will be allocated to the human voice band than the noise band in the NS process, so as to achieve the effect of effectively enhancing a human voice component in the audio signal and suppressing a noise component in the audio signal, the gain parameter of each audio frame on each band can help to identify whether a target voice is contained in each audio frame, thereby determining whether the target voice is contained in the entire audio signal.

306: The terminal determines a gain parameter of each audio frame on each band in a second band range based on the gain parameter of the audio frame on each band in the first band range, the second band range being a subset of the first band range.

In some embodiments, since both the human voice band and the noise band are contained in the first band range, and the VAD decision may make a fine decision only on the human voice band without concern about the noise band, the terminal acquires a subset formed by the human voice band from the first band range as the second band range. Since the terminal has acquired the gain parameter of each audio frame on each band in the first band range through the NS model and the second band range is a subset of the first band range, it is thus apparent that the gain parameter of each audio frame on each band in the second band range can be determined.

It is to be noted that the second band range may be adapted for users of different genders or different ages. For example, the sound frequency of a female is generally higher than that of a male, whereby the terminal may configure different second band ranges for different users. The second band range is not limited in this embodiment of the disclosure.

In an implementation scene, the first band range refers to a total of 18 bands of 0-8000 Hz in the Opus band diagram, while the second band range refers to a total of 9 bands of 200-2000 Hz: 200, 400, 600, 800, 1000, 1200, 1400, 1600, and 2000, or the second band range refers to a total of 5 bands of 300-1000 Hz: 300, 400, 600, 800, and 1000. The band values are in Hz.

307: The terminal determines a voice state parameter of the audio frame based on the gain parameter of the audio frame on each band in the second band range.

In some embodiments, the terminal multiplies the gain parameter of each audio frame on each band in the second band range by a weight coefficient of a corresponding band to obtain a weighted gain parameter of the audio frame on each band in the second band range, adds the weighted gain parameters of the audio frame on the respective bands in the second band range to obtain a comprehensive gain parameter of the audio frame, and determines a voice state parameter of the audio frame based on the integrated gain parameter of the audio frame.

In the foregoing process, since the second band range contains most of the human voice band in the first band range, namely, the energy of human voice mostly falls within the second band range (such as 200-2000 Hz or 300-1000 Hz), the gain parameter of each audio frame on each band within the second band range can best represent whether someone is currently speaking (namely, whether the target voice is contained in the current audio frame).

In some embodiments, in a case that the target voice is the sound of the target object, a wider second band range may be configured so as to recognize the sound of the target object on more human voice bands. In a case that the target voice is the speech of the target object in the multi-person voice call, a narrower second band range may be configured so as to exclude the sound when chatting on a part of the lower human voice bands. This embodiment of the disclosure is not limited thereto.

Optionally, the terminal pre-stores a corresponding relationship between each band in the second band range and a weight coefficient. For each band in the second band range, a weight coefficient corresponding to the band is determined based on the corresponding relationship, the gain parameter of the audio frame on the band is multiplied by the weight coefficient corresponding to the band to obtain a weighted gain parameter of the audio frame on the band.

Optionally, the terminal adds the weighted gain parameters of each audio frame on all bands within the second band range to obtain a comprehensive gain parameter of the audio frame. Based on a magnitude relationship between the comprehensive gain parameter and the activation threshold, a voice state parameter of the audio frame may be determined. Optionally, the voice state parameter includes "containing a target voice" and "not containing a target voice". For example, the voice state parameter is Boolean data. The value of the Boolean data is True, representing "containing a target voice", and the value of the Boolean data is False, representing "not containing a target voice". Or, the voice state parameter is binarized data. The value of the binarized data is 1, representing "containing a target voice", and the value of the binarized data is 0, representing "not containing a target voice". Or, the voice state parameter is character string data or the like. The data type of the voice state parameter is not limited in this embodiment of the disclosure.

In some embodiments, the terminal determines that the voice state parameter is "containing a target voice" in a case that the comprehensive gain parameter amplified by a target multiple is greater than an activation threshold, and determines that the voice state parameter is "not containing a target voice" in a case that the comprehensive gain parameter amplified by the target multiple is less than or equal to the activation threshold. The target multiple is any value greater than 1. For example, the target multiple is 10000. The activation threshold is any value greater than 0. For example, the activation threshold is 6000.

In an implementation scene, the second band range is 200-2000 Hz, the target multiple is 10000, and the activation threshold is 6000. After a user switches on a multi-person voice call, a piece of voice is spoken to a microphone in a microphone mute state. After acquiring an audio signal, the microphone acquires a gain parameter on each band within 200-2000 Hz for each frame (assuming that the length of each frame is 20 ms). The gain parameter is a value greater than or equal to 0 and less than or equal to 1. The gain parameters on the respective bands within 200-2000 Hz of each frame are weighted and summed to obtain a comprehensive gain parameter of each frame. The comprehensive gain parameter of each frame is amplified by a factor of 10000. If the amplified value is greater than 6000, it is considered that this frame is activated, and a VAD value of the frame is set to 1, representing that the voice state parameter of the frame is "containing a target voice". If the amplified value is less than or equal to 6000, it is considered that this frame is unactivated, and a VAD value of the frame is set to 0, representing that the voice state parameter of the frame is "not containing a target voice".

In the foregoing process, a comprehensive gain parameter of each audio frame is obtained by weighting and summing gain parameters on respective band within a second band range, and the comprehensive gain parameter is amplified for determining a voice state of the current audio frame, namely, determining a voice state parameter of the audio frame. It can be determined whether a target voice is contained in each audio frame through the comprehensive gain parameter of each audio frame so as to achieve accurate frame-level human voice identification.

In operations 306-307, the terminal determines the voice state parameters of the multiple audio frames based on the gain parameters of the multiple audio frames on the multiple bands. The voice state parameter is used for representing whether a target voice is contained in the corresponding audio frame. The terminal can determine, based on the voice state parameters of the multiple audio frames, that the target voice is contained in the audio signal. This embodiment of the disclosure describes an example in which the gain parameters on the respective bands within the second band range are weighted and summed to obtain a comprehensive gain parameter of each audio frame and the voice state parameter of each audio frame is determined based on the comprehensive gain parameter since the second band range contains most of the human voice band. In other embodiments, the terminal further weights and sums the gain parameters on the respective bands within the first band range to obtain a comprehensive gain parameter of each audio frame, and determines a voice state parameter of each audio frame based on the comprehensive gain parameter, thereby simplifying the processing flow of the audio signal.

In some embodiments, the terminal obtains an energy parameter of each audio frame and determines a voice state parameter of each audio frame in combination with the comprehensive gain parameter and the energy parameter of each audio frame. Or, the terminal performs NS on the first signal based on the gain parameter of each audio frame within the first band range, and inputs a noise-suppressed signal into a VAD algorithm for VAD so as to obtain the voice state parameter of each audio frame. This will be described in detail in the subsequent embodiments. The manner of obtaining the voice state parameter of each audio frame is not limited in this embodiment of the disclosure.

308: The terminal determines, based on the voice state parameters of the audio frame and a first target number of audio frames preceding the audio frame, an activation state of an audio frame group where the audio frame is located, the audio frame group including the audio frame and the first target number of audio frames preceding the audio frame.

The audio frame refers to any audio frame in the multiple audio frames. In other words, operation 308 is performed on each audio frame in the multiple audio frames.

In some embodiments, the audio signal acquired by the microphone is an audio stream since the user is typically continuously transmitting the audio signal to the microphone. In an audio stream scene, one may refer to any audio frame in the audio stream and voice state parameters of a target number of audio frames preceding the audio frame to comprehensively determine whether a target voice is contained in the audio signal in the time period covered by these audio frames. The target number is determined based on a first target number and a second target number. For example, the target number is a value obtained by subtracting one from a result of multiplying a value obtained by the first target number plus one by a value obtained by the second target number plus one. The first target number is any integer greater than or equal to 1, and the second target number is any integer greater than or equal to 1. For example, if the first target number is 4 and the second target number is 29, the target number is $(4+1) \times (29+1)-1=149$.

In some embodiments, the terminal determines any audio frame and a first target number of audio frames preceding the audio frame as an audio frame group in which the audio frame is located, and then obtains respective voice state parameters of each audio frame in the audio frame group. Optionally, it is determined that the activation state of the audio frame group is activated in a case that a voice state parameter in the audio frame group is that the number of audio frames containing the target voice exceeds a number threshold. It is determined that the activation state of the audio frame group is unactivated in a case that the voice state parameter in the audio frame group is that the number of audio frames containing the target voice does not exceed the number threshold. The number threshold is greater than or equal to 1 and less than or equal to the value obtained by the first target number plus one. For example, if the first target number is 4, the number threshold is greater than or equal to 1 and less than or equal to 5.

In the foregoing process, if the target voice is contained in the audio frames in each audio frame group exceeding a certain number threshold, it is considered that the entire audio frame group is activated, and it can be better determined whether the target voice is contained in the current audio frame group. Since non-steady-state noise usually does not appear intensively in the same audio frame group, the situation of falsely determining whether the audio frame group is activated due to individual non-steady-state noise (such as keyboard tone) is reduced, and the accuracy of identifying whether the target voice is contained in the audio signal is improved.

In some embodiments, if there are a consecutive preset threshold of voice state parameters of audio frames representing "containing a target voice" in the audio frame group, it is determined that the activation state of the audio frame group is activated. If there is not a consecutive preset threshold of voice state parameters of audio frames representing "containing a target voice" in the audio frame group, it is determined that the activation state of the audio frame group is unactivated. The preset threshold is greater than or equal to 1 and less than or equal to the value obtained by the first target number plus one. For example, if the first target number is 4, the preset threshold is greater than or equal to 1 and less than or equal to 5.

In the foregoing process, if the target voice is contained in a consecutive preset threshold of audio frames in each audio frame group, it is considered that the entire audio frame group is activated, and it can be better determined whether the target voice is contained in the current audio frame group. Since non-steady-state noise or user chat usually does not appear continuously in multiple consecutive audio frames within the same audio frame group, the situation of falsely determining whether the audio frame group is activated due to individual non-steady-state noise (such as keyboard tone) is reduced, and the accuracy of identifying whether the target voice is contained in the audio signal is improved.

In an implementation scene, the foregoing discrimination in units of an audio frame group is referred to as a short filtering algorithm policy. It is assumed that each audio frame has a length of 20 ms (milliseconds). In a case that the first target number is 4, each audio frame group contains one current audio frame and four audio frames preceding the audio frame. That is, each audio frame group contains five audio frames. Each audio frame group has a length of 100 ms. Optionally, each audio frame group is referred to as a block. Each audio frame has a voice state parameter, i.e. a VAD value of 1, representing "containing a target voice", and a voice state parameter, i.e. a VAD value of 0, representing "not containing a target voice".

In some embodiments, each block is subjected to statistics once. It is assumed that the number threshold is 4. If the number of audio frames with a VAD value of 1 within the current block exceeds 4, it is considered that the current block is activated. If the number of audio frames with a VAD value of 1 within the current block does not exceed 4, it is considered that the current block is unactivated.

In some embodiments, each block is subjected to statistics once. It is assumed that the preset threshold is 4. If the VAD value of four consecutive audio frames within the current block is 1, it is considered that the current block is activated. If the VAD value of four consecutive audio frames within the current block is not 1, it is considered that the current block is unactivated.

309: The terminal determines that the target voice is contained in the audio signal in a case that the activation states of the audio frame group and a second target number of audio frame groups preceding the audio frame group satisfy a second condition.

In some embodiments, if the number of activated audio frame groups in the audio frame group and a second target number of audio frame groups preceding the audio frame group exceeds a target threshold, a second condition is satisfied, so as to determine that a target voice is contained in the audio signal. If the number of activated audio frame groups in the audio frame group and a second target number of audio frame groups preceding the audio frame group does not exceed the target threshold, the second condition is not satisfied, so as to determine that the target voice is not contained in the audio signal. That is to say, the second condition is: the number of activated audio frame groups in the audio frame group and the second target number of audio frame groups preceding the audio frame group exceeds the target threshold. The target threshold is greater than or equal to 1 and less than or equal to the value obtained by the second target number plus one. For example, if the second target number is 29, the target threshold is greater than or equal to 1 and less than or equal to 30.

In the foregoing process, if the audio frame groups exceeding a certain target threshold are activated in the audio frame group and the second target number of audio frame groups preceding the audio frame group, it is considered that the entire audio signal contains the target voice, thereby reducing the interference caused by some random errors, and improving the accuracy of identifying whether the target voice is contained in the audio signal.

In some embodiments, if the activation state of a consecutive specified threshold of audio frame groups is activated in the audio frame group and the second target number of audio frame groups preceding the audio frame group, the second condition is satisfied, so as to determine that the target voice is contained in the audio signal. If the activation state of a consecutive specified threshold of audio frame groups is not activated in the audio frame group and the second target number of audio frame groups preceding the audio frame group, the second condition is not satisfied, so as to determine that the target voice is not contained in the audio signal. That is to say, the second condition is: the activation state of a consecutive specified threshold of audio frame groups is activated in the audio frame group and the second target number of audio frame groups preceding the audio frame group. The specified threshold is greater than or equal to 1 and less than or equal to the value obtained by the second target number plus one. For example, if the second target number is 29, the specified threshold is greater than or equal to 1 and less than or equal to 30.

In the foregoing process, if the activation state of a consecutive specified threshold of audio frame groups is activated in the audio frame group and the second target number of audio frame groups preceding the audio frame group, it is considered that the entire audio signal contains the target voice, thereby reducing the interference caused by some random errors, and improving the accuracy of identifying whether the target voice is contained in the audio signal.

In an implementation scene, the foregoing discrimination in units of an audio frame group with the value obtained by the second target number plus one is referred to as a long filtering algorithm policy. It is assumed that each audio frame has a length of 20 ms. In a case that the first target number is 4, each audio frame group (referred to as a block) has a length of 100 ms. In a case that the second target number is 29, the current audio frame group and 29 audio frame groups preceding the audio frame group are referred to as one duration. Since each duration includes 30 audio frame groups in total, the length of each duration is 3 s (seconds). That is, a duration of 3 s includes 30 blocks of 100 ms. Optionally, the audio signal is subjected to statistics using a sliding window policy. It is assumed that the step size of the sliding window is one block. Since the length of one block is 100 ms, one sliding window can just cover one duration in a case that the size of the sliding window is 30, whereby statistics on one duration once can be performed at each sliding. In other words, the audio signal is subjected to statistics using a sliding window having a size of 30 and a step size of 100 ms.

In some embodiments, it is assumed that the target threshold is 10. If the number of activated blocks within a sliding window, i.e. duration, exceeds 10, the second condition is satisfied, and it is determined that the target voice is contained in the audio signal. That is, it is determined that the target voice is contained in the audio signal based on the gain parameters of the multiple audio frames on the multiple bands. The following operation 310 is performed to output a prompt message. Otherwise, no prompt processing is performed.

In some embodiments, it is determined that the specified threshold is 10. If there are ten consecutive blocks activated within a sliding window, i.e. duration, the second condition is satisfied, and it is determined that the target voice is contained in the audio signal. That is, it is determined that the target voice is contained in the audio signal based on the gain parameters of the multiple audio frames on the multiple bands. The following operation 310 is performed to output a prompt message. Otherwise, no prompt processing is performed.

In some embodiments, in a case that the audio signal is an audio stream, it is determined that the target voice is contained in the audio signal in response to the current sliding window satisfying the second condition. Since the sliding window is movingly detected on the audio signal in steps of 100 ms, after the terminal outputs the prompt message externally, all statistical states of the duration and the block of the sliding window are reset. In other words, in a case that the audio stream is constantly received, a target number of audio frames within 3 s before the current time are detected each time based on the short filtering algorithm policy and the long filtering algorithm policy. If the second condition is satisfied, the prompt message is outputted externally, and all statistical states of the duration and the block of the sliding window are reset. If the second condition is not satisfied, the sliding window is controlled to continue sliding backwards in steps of 100 ms. Optionally, if the length of the currently acquired audio signal is less than 3 s, or the length of the newly acquired audio signal after the sliding window is reset is less than 3 s, the window is in a filling state. It is not determined whether the target voice is contained in the audio signal in the window filling state, and the corresponding identification result is not determined until the sliding window is filled for the first time.

In operations 308-309, a possible implementation of determining that the target voice is contained in the audio signal in a case that voice state parameters of any audio frame and a target number of audio frames preceding the audio frame satisfy a first condition is provided. The target number is determined based on a first target number and a second target number. That is to say, the first condition is: the activation states of an audio frame group where the audio frame is located and a second target number of audio frame groups preceding the audio frame group satisfy a second condition.

310: The terminal outputs a prompt message, the prompt message being used for prompting to disable the microphone mute state.

Operation 310 is similar to operation 203, and will not be described in detail herein.

In the foregoing process, in a case that the terminal determines that the target voice is contained in the audio signal based on the gain parameter, the terminal outputs the prompt message so as to prompt the user to disable the microphone mute state in time, thereby avoiding invalid communication and improving the human-computer interaction efficiency.

Figure 5:
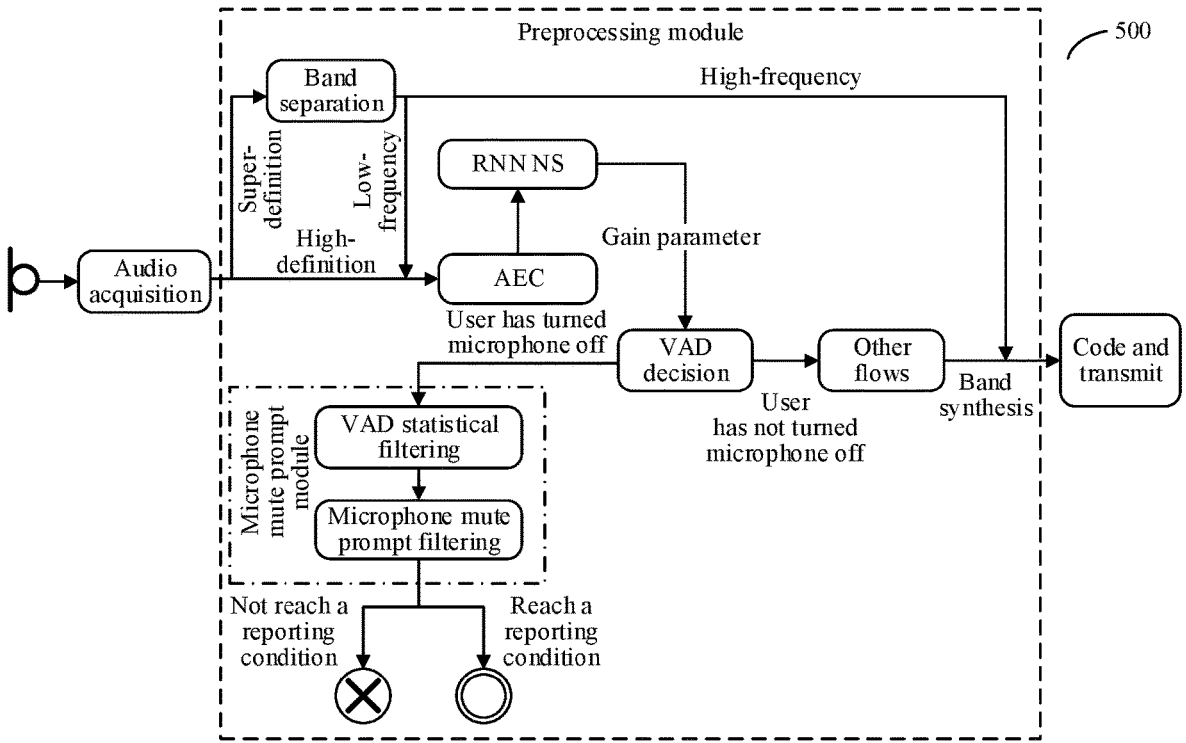
FIG. 5 is a schematic diagram of an audio signal processing method according to an embodiment of the disclosure.

FIG. 5 is a schematic diagram of an audio signal processing method according to an embodiment of the disclosure. As shown in a diagram 500, a microphone acquires an audio signal. After framing, windowing, and Fourier transform, a sampling rate of the audio signal is determined. If the sampling rate is greater than a sampling rate threshold, the audio signal is a super-definition signal. If the sampling rate is less than or equal to the sampling rate threshold, the audio signal is a high-definition signal. Band separation is performed on the super-definition signal, the audio signal is separated into a low-frequency signal and a high-frequency signal, and the low-frequency signal is directly inputted into an acoustic echo canceller (AEC module) to cancel an acoustic echo. For the high-definition signal, there is no need to perform band separation. The high-definition signal is directly inputted into the AEC module to cancel the acoustic echo. The audio signal after AEC is a first signal. Multiple audio frames in the first signal are inputted into an RNN NS model. The RNN NS model outputs a gain parameter on each band of 0-8000 Hz for each audio frame. The gain parameter on each band of 0-8000 Hz for each audio frame is inputted into a VAD decision module. The gain parameter on each band of 200-2000 Hz extracted from each audio frame is weighted and summed to obtain a comprehensive gain parameter of each audio frame. Then a voice state parameter VAD value of each audio frame is determined. At this moment, if the terminal is in a microphone mute state, the VAD value of each audio frame is inputted into a microphone mute prompt module. VAD statistical filtering is performed based on a short filtering algorithm policy (namely, counting activated audio frames in an instantaneous time such as a current block). Microphone mute prompt filtering is performed based on a long filtering algorithm policy (namely, counting activated blocks in a long time such as a current duration). If the number of activated blocks in the current duration exceeds a target threshold, it is determined that a target voice is contained in the audio signal. If the number of activated blocks in the current duration does not exceed the target threshold, it is determined that the target voice is not contained in the audio signal.

If the target voice is contained in the audio signal, a user transmits the target voice in the microphone mute state, namely, a reporting condition is reached. Then a prompt message is outputted externally. If the target voice is contained in the audio signal, the user does not transmit the target voice in the microphone mute state, namely, the reporting condition is not reached. Then the prompt message is not outputted. Optionally, after the VAD decision module outputs the VAD value of each audio frame, if the terminal is in a microphone on state, the audio signal acquired by the microphone may be normally transmitted to other terminals participating in a multi-person voice call at this moment, so as to ensure the normal transmission of the audio signal. For the super-definition signal, the low-frequency signal and the original high-frequency signal obtained by band separation may be band-synthesized, and are restored to be the original super-definition signal, and then the super-definition signal is coded and transmitted. Certainly, there is no need to perform band synthesis on the high-definition signal due to no need of band separation, and the high-definition signal is coded and transmitted directly. In some embodiments, the terminal transmitted the coded audio signal to a server, and the server forwards the coded audio signal to other terminals participating in the multi-person voice call.

For example, band separation is performed on a super-definition signal of 16 kHz acquired by the microphone based on a QMF analysis filter, a high-frequency signal of 8 kHz and a low-frequency signal of 8 kHz are outputted, and subsequent NS and VAD decision only act on the low-frequency signal of 8 kHz. If the terminal is in a microphone on state at this moment, the high-frequency signal of 8 kHz and the low-frequency signal of 8 kHz may be re-synthesized into a super-definition signal of 16 kHz using a QMF synthesis filter, and then the super-definition signal is coded and transmitted.

In some embodiments, in a case that the terminal is in the microphone on state, prior to performing band composition and coding transmission on the audio signal, AGC processing is also supported on the audio signal even if a gain parameter of an amplification circuit is automatically adjusted with the signal strength, thereby improving the transmission effect of the audio signal.

The foregoing optional technical solutions can be combined in any form to form optional embodiments of the present disclosure, and will not be described in detail herein.

According to the method provided in this embodiment of the disclosure, an application still acquires an audio signal of a user in a case of being in a microphone mute state in a multi-person voice call, but does not transmit the acquired audio signal to other accounts participating in the multi-person voice call. The application performs signal analysis and processing on the audio signal, and determines whether a target voice is contained in the audio signal by using gain parameters of multiple audio frames in the audio signal respectively on multiple bands in a first band range. If the target voice is contained in the audio signal, it is indicated that the user starts to speak without disabling the microphone mute state, so as to output a prompt message externally, thereby prompting the user to disable the microphone mute state in time, reducing the loss of communication efficiency caused by the user having not found that the microphone is mute, improving the human-computer interaction efficiency, and optimizing user experience.

In the foregoing embodiments, it is shown how the terminal determines whether the target voice is contained in the audio signal based on the gain parameter of each audio frame on each band. However, in this embodiment of the disclosure, it will be described how the terminal combines the gain parameter of each audio frame on each band and the energy parameter of each audio frame to perform a comprehensive judgment on whether the target voice is contained in the audio signal, namely, perform a comprehensive VAD decision on the gain parameter outputted by each audio frame based on the energy parameter of each audio frame and the NS model. The description is as follows.

Figure 6:
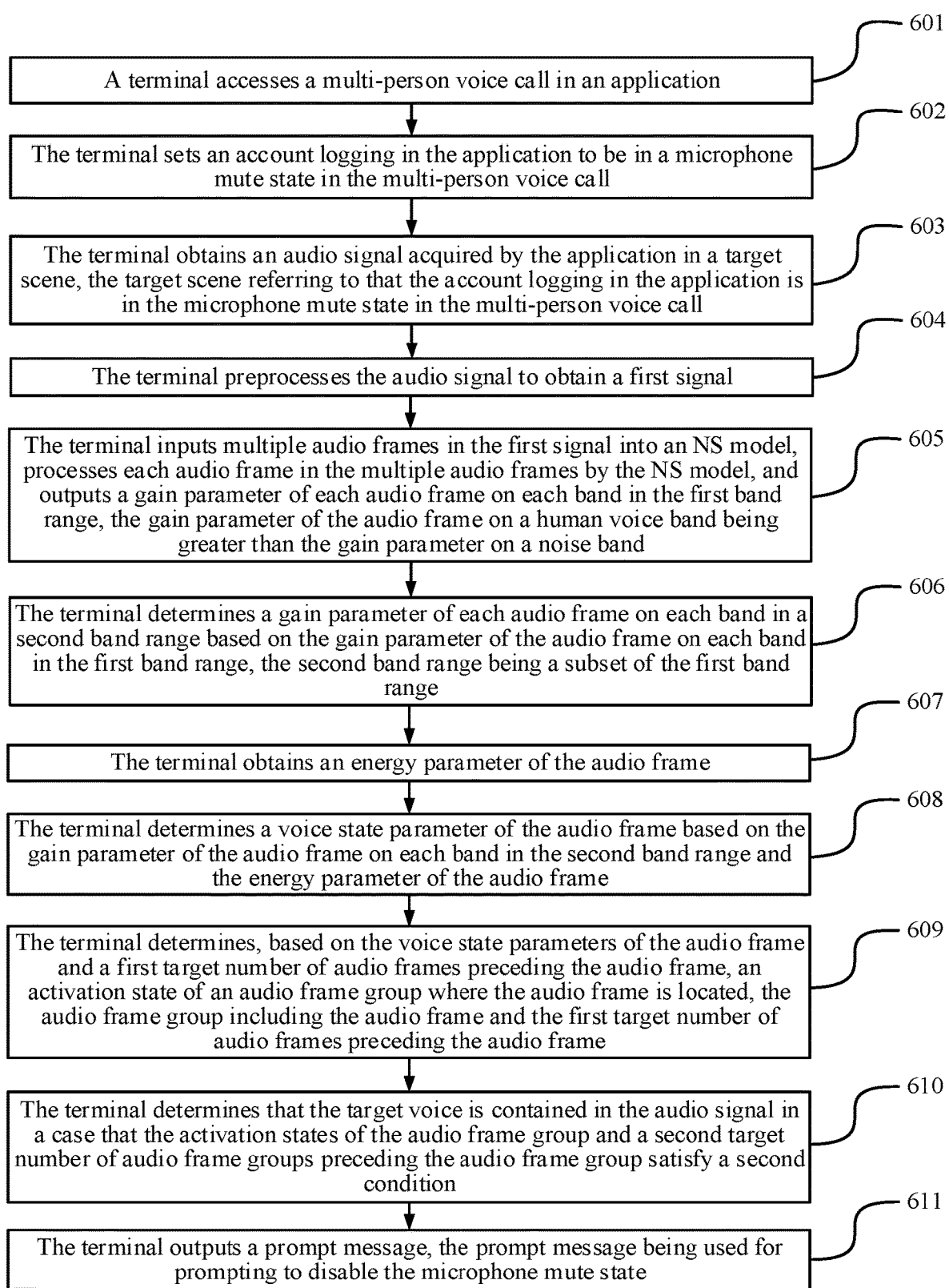
FIG. 6 is a flowchart of an audio signal processing method according to an embodiment of the disclosure.

FIG. 6 is a flowchart of an audio signal processing method according to an embodiment of the disclosure. Referring to FIG. 6, this embodiment is performed by an electronic device, and describes an example where the electronic device is a terminal. The terminal refers to any terminal participating in a multi-person voice call, such as the first terminal 120 or the second terminal 160 in the foregoing implementation environment. This embodiment includes the following operations:

601: A terminal accesses a multi-person voice call in an application.

Operation 601 is similar to operation 301, and will not be described in detail herein.

602: The terminal sets an account logging in the application to be in a microphone mute state in the multi-person voice call.

Operation 602 is similar to operation 302, and will not be described in detail herein.

603: The terminal obtains an audio signal acquired by the application in a target scene, the target scene referring to that the account logging in the application is in the microphone mute state in the multi-person voice call.

Operation 603 is similar to operation 303, and will not be described in detail herein.

604: The terminal preprocesses the audio signal to obtain a first signal.

Operation 604 is similar to operation 304, and will not be described in detail herein.

605: The terminal inputs multiple audio frames in the first signal into an NS model, processes each audio frame in the multiple audio frames by the NS model, and outputs a gain parameter of each audio frame on each band in the first band range, the gain parameter of the audio frame on a human voice band being greater than the gain parameter on a noise band.

Operation 605 is similar to operation 305, and will not be described in detail herein.

606: The terminal determines a gain parameter of each audio frame on each band in a second band range based on the gain parameter of the audio frame on each band in the first band range, the second band range being a subset of the first band range.

Operation 606 is similar to operation 306, and will not be described in detail herein.

607: The terminal obtains an energy parameter of the audio frame.

In some embodiments, the terminal determines an amplitude norm of the audio frame as an energy parameter of the audio frame. Since the terminal performs operation 607 for each audio frame, energy parameters of the multiple audio frames in the audio signal can be acquired.

608: The terminal determines a voice state parameter of the audio frame based on the gain parameter of the audio frame on each band in the second band range and the energy parameter of the audio frame.

In some embodiments, the terminal determines a comprehensive gain parameter of each audio frame based on the gain parameters of the audio frame on the multiple bands. The manner in which the comprehensive gain parameter is obtained is similar to operation 307, and will not be described in detail herein.

In some embodiments, the terminal determines that the voice state parameter of the audio frame is "containing a target voice" in a case that the comprehensive gain parameter of the audio frame amplified by a target multiple is greater than an activation threshold and the energy parameter of the audio frame is greater than an energy threshold, and determines that the voice state parameter of the audio frame is "not containing a target voice" in a case that the comprehensive gain parameter of the audio frame amplified by the target multiple is less than or equal to the activation threshold or the energy parameter of the audio frame is less than or equal to the energy threshold. The target multiple is any value greater than 1. For example, the target multiple is 10000. The activation threshold is any value greater than 0. For example, the activation threshold is 6000. The energy threshold is any value greater than or equal to 0 and less than or equal to 100. For example, the energy threshold is 30.

In an implementation scene, the second band range is 200-2000 Hz, the target multiple is 10000, the activation threshold is 6000, and the energy threshold is 30. After a user switches on a multi-person voice call, a piece of voice is spoken to a microphone in a microphone mute state. After acquiring an audio signal, the microphone acquires a gain parameter on each band within 200-2000 Hz for each frame (assuming that the length of each frame is 20 ms). The gain parameter is a value greater than or equal to 0 and less than or equal to 1. The gain parameters on the respective bands within 200-2000 Hz of each frame are weighted and summed to obtain a comprehensive gain parameter of each frame. The comprehensive gain parameter of each frame is amplified by a factor of 10000. If the amplified value is greater than 6000, it is considered that the voice state of a current frame is activated. Also, an energy parameter of the current frame is calculated. If the energy parameter is greater than 30, it is considered that the energy parameter of the current frame is also activated. In the VAD decision, only if the voice state and the energy parameter are activated at the same time in the audio frame, the voice state parameter, namely, the VAD value, will be set to 1. Otherwise, the voice state parameter, namely, the VAD value, is set to 0 as long as the voice state is not activated (an amplified gain parameter is less than or equal to 6000) or the energy parameter is not activated (the energy parameter is less than or equal to 30).

In the foregoing process, in the process of performing a VAD decision on each audio frame, conditions corresponding to the gain parameter and the energy parameter are preferably satisfied before the VAD value of the current frame is set to 1. That is, the VAD value of the current frame is calculated by combining the factors of both the gain and the energy. The energy parameter can intuitively reflect the volume of a user speaking, so as to roughly estimate the distance between the user and the microphone, thereby preventing a far-field sound from being misjudged as a near-field human voice, and further improving the accuracy of human voice identification.

In operations 605-608, the terminal determines the voice state parameters of the multiple audio frames based on the gain parameters of the multiple audio frames on the multiple bands and the energy parameters of the multiple audio frames, and can perform VAD based on the RNN NS model and energy detection, so as to accurately recognize the target voice and noise while controlling a relatively small computing complexity, thereby realizing a very high identification accuracy especially for non-steady-state noise, and reducing false reporting and wrong reporting, whereby the speaking state of a user can be sensitively captured, and a prompt message can be reported and outputted in time.

609: The terminal determines, based on the voice state parameters of the audio frame and a first target number of audio frames preceding the audio frame, an activation state of an audio frame group where the audio frame is located, the audio frame group including the audio frame and the first target number of audio frames preceding the audio frame.

Operation 609 is similar to operation 308, and will not be described in detail herein.

610: The terminal determines that the target voice is contained in the audio signal in a case that the activation states of the audio frame group and a second target number of audio frame groups preceding the audio frame group satisfy a second condition.

Operation 610 is similar to operation 309, and will not be described in detail herein.

611: The terminal outputs a prompt message, the prompt message being used for prompting to disable the microphone mute state.

Operation 611 is similar to operation 310, and will not be described in detail herein.

Figure 7:
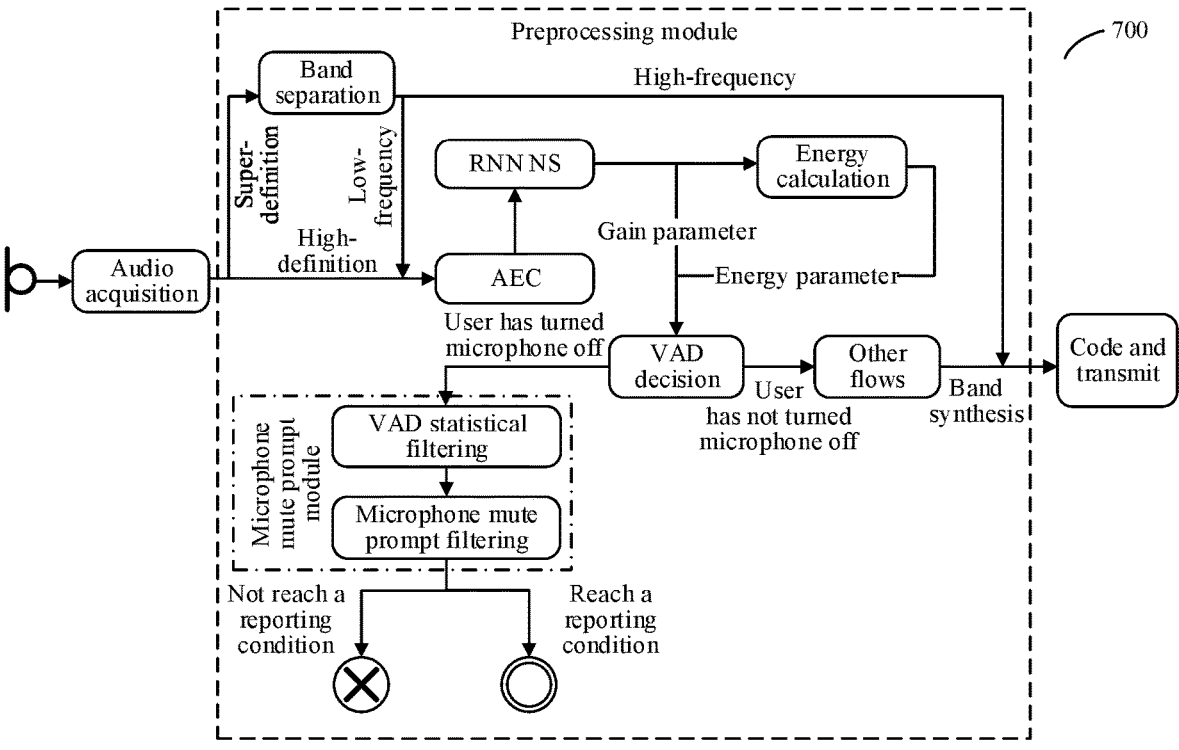
FIG. 7 is a schematic diagram of an audio signal processing method according to an embodiment of the disclosure.

FIG. 7 is a schematic diagram of an audio signal processing method according to an embodiment of the disclosure. As shown in a diagram 700, a microphone acquires an audio signal. After framing, windowing, and Fourier transform, a sampling rate of the audio signal is determined. If the sampling rate is greater than a sampling rate threshold, the audio signal is a super-definition signal. If the sampling rate is less than or equal to the sampling rate threshold, the audio signal is a high-definition signal. Band separation is performed on the super-definition signal, the audio signal is separated into a low-frequency signal and a high-frequency signal, and the low-frequency signal is directly inputted into an AEC module to cancel an acoustic echo. For the high-definition signal, there is no need to perform band separation. The high-definition signal is directly inputted into the AEC module to cancel the acoustic echo. The audio signal after AEC is a first signal. Multiple audio frames in the first signal are inputted into an RNN NS model. The RNN NS model outputs a gain parameter on each band of 0-8000 Hz for each audio frame. The gain parameter on each band of 0-8000 Hz for each audio frame is inputted into a VAD decision module. In addition, energy calculation is performed on each audio frame, and an energy parameter of each audio frame is also inputted into the VAD decision module. In the VAD decision module, the gain parameter on each band of 200-2000 Hz is extracted from each audio frame and is weighted and summed to obtain a comprehensive gain parameter of each audio frame. The voice state parameter VAD value of each audio frame is comprehensively determined by combining the comprehensive gain parameter and the energy parameter. Only if both the gain and energy conditions are satisfied, the VAD value of the audio frame is set to 1. Otherwise, as long as either of the gain and energy conditions is not activated, the VAD value of the audio frame is set to 0.

At this moment, if the terminal is in a microphone mute state, the VAD value of each audio frame is inputted into a microphone mute prompt module. VAD statistical filtering is performed based on a short filtering algorithm policy (namely, counting activated audio frames in an instantaneous time such as a current block). Microphone mute prompt filtering is performed based on a long filtering algorithm policy (namely, counting activated blocks in a long time such as a current duration). If the number of activated blocks in the current duration exceeds a target threshold, it is determined that a target voice is contained in the audio signal. If the number of activated blocks in the current duration does not exceed the target threshold, it is determined that the target voice is not contained in the audio signal.

If the target voice is contained in the audio signal, a user transmits the target voice in the microphone mute state, namely, a reporting condition is reached. Then a prompt message is outputted externally. If the target voice is contained in the audio signal, the user does not transmit the target voice in the microphone mute state, namely, the reporting condition is not reached. Then the prompt message is not outputted. Optionally, after the VAD decision module outputs the VAD value of each audio frame, if the terminal is in a microphone on state, the audio signal acquired by the microphone may be normally transmitted to other terminals participating in a multi-person voice call at this moment, so as to ensure the normal transmission of the audio signal. For the super-definition signal, the low-frequency signal and the original high-frequency signal obtained by band separation may be band-synthesized, and are restored to be the original super-definition signal, and then the super-definition signal is coded and transmitted. Certainly, there is no need to perform band synthesis on the high-definition signal due to no need of band separation, and the high-definition signal is coded and transmitted directly. In some embodiments, the terminal transmitted the coded audio signal to a server, and the server forwards the coded audio signal to other terminals participating in the multi-person voice call.

For example, band separation is performed on a super-definition signal of 16 kHz acquired by the microphone based on a QMF analysis filter, a high-frequency signal of 8 kHz and a low-frequency signal of 8 kHz are outputted, and subsequent NS and VAD decision only act on the low-frequency signal of 8 kHz. If the terminal is in a microphone on state at this moment, the high-frequency signal of 8 kHz and the low-frequency signal of 8 kHz need to be re-synthesized into a super-definition signal of 16 kHz using a QMF synthesis filter, and then the super-definition signal is coded and transmitted.

In some embodiments, in a case that the terminal is in the microphone on state, prior to performing band composition and coding transmission on the audio signal, AGC processing is also supported on the audio signal even if a gain parameter of an amplification circuit is automatically adjusted with the signal strength, thereby improving the transmission effect of the audio signal.

The foregoing optional technical solutions can be combined in any form to form optional embodiments of the present disclosure, and will not be described in detail herein.

According to the method provided in this embodiment of the disclosure, an application still acquires an audio signal of a user in a case of being in a microphone mute state in a multi-person voice call, but does not transmit the acquired audio signal to other accounts participating in the multi-person voice call. The application performs signal analysis and processing on the audio signal, and determines whether a target voice is contained in the audio signal by using gain parameters of multiple audio frames in the audio signal respectively on multiple bands in a first band range. If the target voice is contained in the audio signal, it is indicated that the user starts to speak without disabling the microphone mute state, so as to output a prompt message externally, thereby prompting the user to disable the microphone mute state in time, reducing the loss of communication efficiency caused by the user having not found that the microphone is mute, improving the human-computer interaction efficiency, and optimizing user experience.

In the foregoing embodiments, it is introduced that the VAD decision is performed directly using the gain parameter of each audio frame outputted by the RNN or simultaneously using the gain parameter of each audio frame outputted by the RNN and the energy parameter of each audio frame. Neither of the foregoing two manners is limited to a conventional VAD detection algorithm. However, in this embodiment of the disclosure, a method for combining an RNN NS model and a VAD detection algorithm to identify whether a target voice is contained in an audio signal is involved. The detailed description is as follows.

Figure 8:
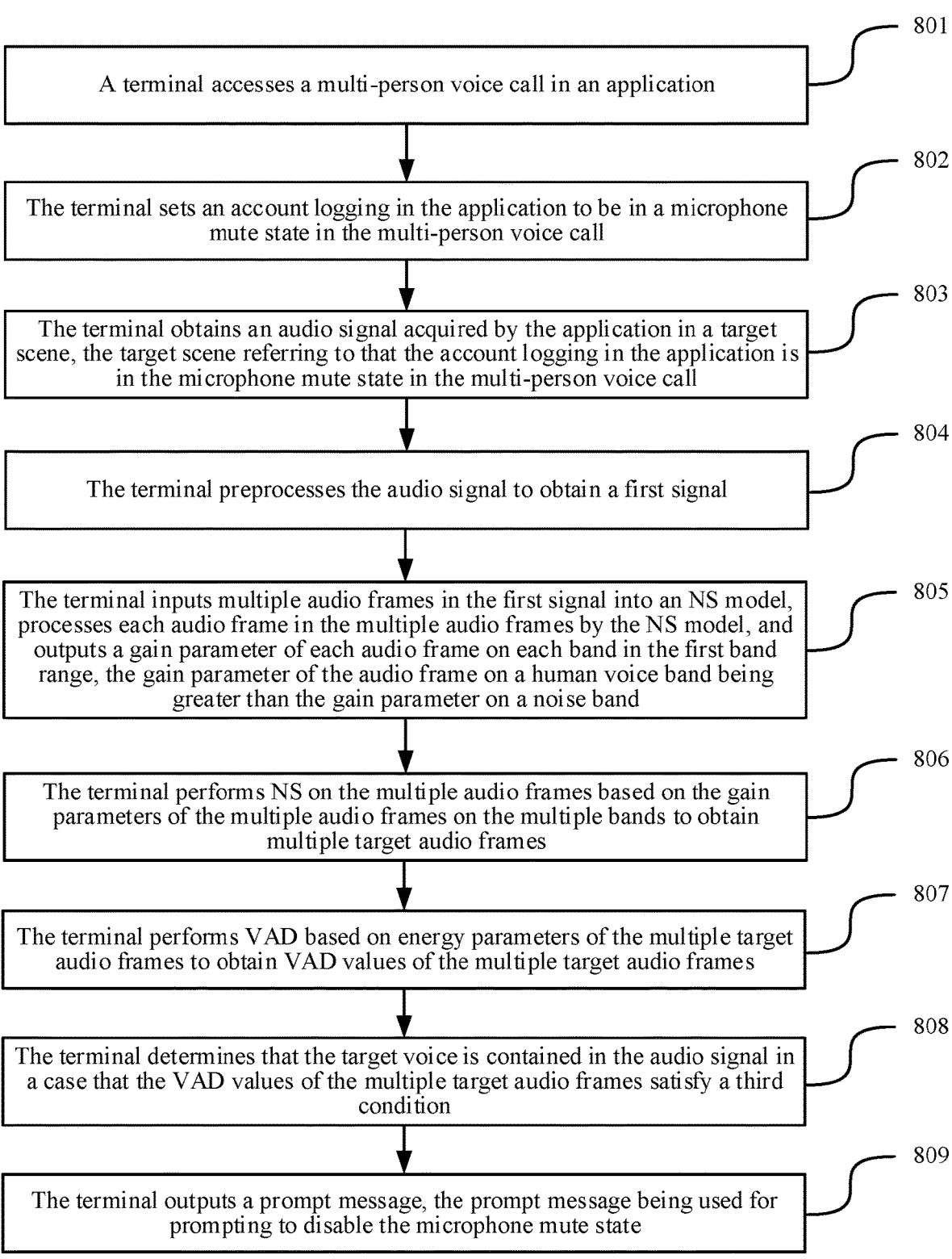
FIG. 8 is a flowchart of an audio signal processing method according to an embodiment of the disclosure.

FIG. 8 is a flowchart of an audio signal processing method according to an embodiment of the disclosure. Referring to FIG. 8, this embodiment is performed by an electronic device, and describes an example where the electronic device is a terminal. The terminal refers to any terminal participating in a multi-person voice call, such as the first terminal 120 or the second terminal 160 in the foregoing implementation environment. This embodiment includes the following operations:

801: A terminal accesses a multi-person voice call in an application.

Operation 801 is similar to operation 301, and will not be described in detail herein.

802: The terminal sets an account logging in the application to be in a microphone mute state in the multi-person voice call.

Operation 802 is similar to operation 302, and will not be described in detail herein.

803: The terminal obtains an audio signal acquired by the application in a target scene, the target scene referring to that the account logging in the application is in the microphone mute state in the multi-person voice call.

Operation 803 is similar to operation 303, and will not be described in detail herein.

804: The terminal preprocesses the audio signal to obtain a first signal.

Operation 804 is similar to operation 304, and will not be described in detail herein.

805: The terminal inputs multiple audio frames in the first signal into an NS model, processes each audio frame in the multiple audio frames by the NS model, and outputs a gain parameter of each audio frame on each band in the first band range, the gain parameter of the audio frame on a human voice band being greater than the gain parameter on a noise band.

Operation 805 is similar to operation 305, and will not be described in detail herein.

806: The terminal performs NS on the multiple audio frames based on the gain parameters of the multiple audio frames on the multiple bands to obtain multiple target audio frames.

In some embodiments, the terminal amplifies or attenuates a signal component of a corresponding band in each audio frame based on a gain parameter of the audio frame on each band in a first band range to obtain a target audio frame, and performs the foregoing operation on each audio frame in multiple audio frames to obtain multiple target audio frames.

807: The terminal performs VAD based on energy parameters of the multiple target audio frames to obtain VAD values of the multiple target audio frames.

In some embodiments, the terminal obtains an amplitude norm of each target audio frame as an energy parameter of the target audio frame, and performs the foregoing operation on each target audio frame in multiple target audio frames to obtain energy parameters of the multiple target audio frames.

In some embodiments, VAD is performed on the energy parameters of the multiple target audio frames using a VAD detection algorithm to output respective VAD values of the multiple target audio frames. Optionally, the VAD detection algorithm includes, but is not limited to, a VAD detection algorithm based on a Gaussian mixture model (GMM), a VAD detection algorithm based on a double threshold, a VAD detection algorithm based on a statistical model, a VAD detection algorithm based on an empirical mode decomposition (EMD), a VAD detection algorithm based on a correlation coefficient method, or a VAD detection algorithm based on a wavelet transform method. This embodiment of the disclosure is not limited thereto.

In an implementation scene, GMM-VAD is taken as an example. The GMM-VAD algorithm assumes that human voice and noise both conform to Gaussian distribution, and assumes that the noise is smoother than the human voice and the noise energy is less than the human voice energy, namely, the mean and variance of the noise signal are less than the mean and variance of the human voice signal. Therefore, two Gaussian models are used to fit the human voice signal and the noise signal in the input signal (namely, the multiple target audio frames, referring to the noise-suppressed first signal), respectively, and the two signals can be separated by the foregoing assumptions. After Gaussian model fitting and separation, six parameters are outputted: the mean, variance and weight of the human voice signal, and the mean, variance and weight of the noise signal.

For example, the input signal (namely, the multiple target audio frames, referring to the noise-suppressed first signal) is divided into six bands: 80-250 Hz, 250-500 Hz, 500-1 KHZ, 1-2 KHz, 2-3 KHz, and 3-4 KHz. The signal is fitted using the GMM model for each band.

When the GMM-VAD algorithm is initialized, the foregoing six parameters will use default values (such as pretrained parameters). Whenever a new target audio frame is inputted into the GMM model, a similarity probability is calculated based on the existing GMM model and whether the current target audio frame is human voice or noise is determined. Then the foregoing six parameters are updated using maximum likelihood estimation according to a determination result of the GMM model, the GMM model is updated, and the foregoing process is iteratively executed to determine whether each target audio frame is human voice or noise. If the target audio frame is human voice, the VAD value of the target audio frame is set to 1. If the target audio frame is noise, the VAD value of the target audio frame is set to 0.

808: The terminal determines that the target voice is contained in the audio signal in a case that the VAD values of the multiple target audio frames satisfy a third condition.

In some embodiments, the terminal also determines the VAD values of the multiple target audio frames based on the short filtering algorithm policy and the long filtering algorithm policy respectively to determine whether the target voice is contained in the audio signal.

Optionally, the terminal determines, based on the VAD values of each target audio frame and a first target number of target audio frames preceding the target audio frame, an activation state of a target audio frame group where the target audio frame is located. The target audio frame group includes the target audio frame and the first target number of target audio frames preceding the target audio frame. In a case that the activation states of the target audio frame group and a second target number of target audio frame groups preceding the target audio frame group satisfy a second condition, the VAD values of the multiple target audio frames satisfy a third condition, and it is determined that the target voice is contained in the audio signal. The foregoing determination manner is similar to operations 308-309, and will not be described in detail herein.

809: The terminal outputs a prompt message, the prompt message being used for prompting to disable the microphone mute state.

Operation 809 is similar to operation 310, and will not be described in detail herein.

Figure 9:
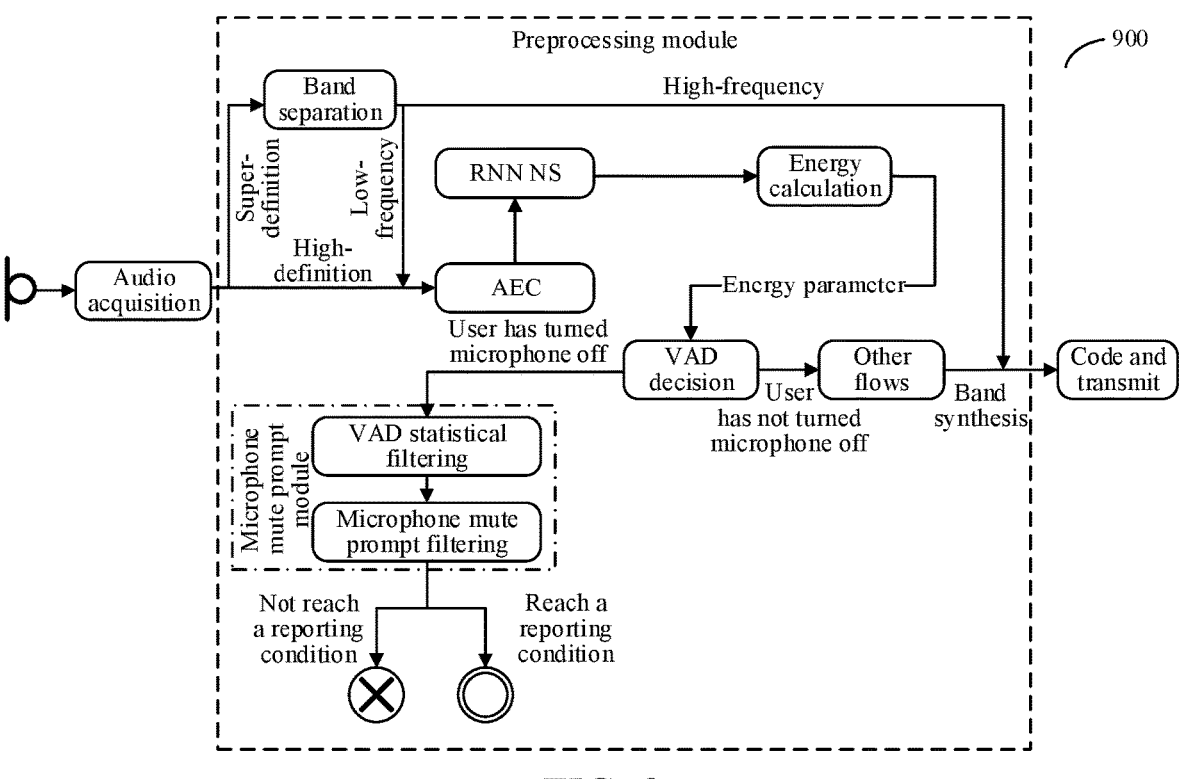
FIG. 9 is a schematic diagram of an audio signal processing method according to an embodiment of the disclosure.

FIG. 9 is a schematic diagram of an audio signal processing method according to an embodiment of the disclosure. As shown in a diagram 900, a microphone acquires an audio signal. After framing, windowing, and Fourier transform, a sampling rate of the audio signal is determined. If the sampling rate is greater than a sampling rate threshold, the audio signal is a super-definition signal. If the sampling rate is less than or equal to the sampling rate threshold, the audio signal is a high-definition signal. Band separation is performed on the super-definition signal, the audio signal is separated into a low-frequency signal and a high-frequency signal, and the low-frequency signal is directly inputted into an AEC module to cancel an acoustic echo. For the high-definition signal, there is no need to perform band separation. The high-definition signal is directly inputted into the AEC module to cancel the acoustic echo. The audio signal after AEC is a first signal. Multiple audio frames in the first signal are inputted into an RNN NS model. The RNN NS model outputs a gain parameter on each band of 0-8000 Hz for each audio frame. NS is performed on each audio frame based on the respective gain parameters to obtain multiple target audio frames. Energy calculation is performed on each target audio frame to obtain an energy parameter of each target audio frame. The energy parameter of each target audio frame is inputted into the GMM-VAD module, and the GMM model is used for predicting whether each target audio frame is the target voice or noise. If the target audio frame is the target voice, the VAD value of the target audio frame is set to 1. If the target audio frame is the noise, the VAD value of the target audio frame is set to 0.

At this moment, if the terminal is in a microphone mute state, the VAD value of each target audio frame is inputted into a microphone mute prompt module. VAD statistical filtering is performed based on the short filtering algorithm policy (namely, counting activated target audio frames in an instantaneous time such as a current block). Microphone mute prompt filtering is performed based on the long filtering algorithm policy (namely, counting activated blocks in a long time such as a current duration). If the number of activated blocks in the current duration exceeds a target threshold, it is determined that a target voice is contained in the audio signal. If the number of activated blocks in the current duration does not exceed the target threshold, it is determined that the target voice is not contained in the audio signal.

If the target voice is contained in the audio signal, a user transmits the target voice in the microphone mute state, namely, a reporting condition is reached. Then a prompt message is outputted externally. If the target voice is contained in the audio signal, the user does not transmit the target voice in the microphone mute state, namely, the reporting condition is not reached. Then the prompt message is not outputted. Optionally, after the GMM-VAD module outputs the VAD value of each target audio frame, if the terminal is in a microphone on state, the audio signal acquired by the microphone may be normally transmitted to other terminals participating in a multi-person voice call at this moment, so as to ensure the normal transmission of the audio signal. For the super-definition signal, the low-frequency signal and the original high-frequency signal obtained by band separation may be band-synthesized, and are restored to be the original super-definition signal, and then the super-definition signal is coded and transmitted. Certainly, there is no need to perform band synthesis on the high-definition signal due to no need of band separation, and the high-definition signal is coded and transmitted directly. In some embodiments, the terminal transmitted the coded audio signal to a server, and the server forwards the coded audio signal to other terminals participating in the multi-person voice call.

For example, band separation is performed on a super-definition signal of 16 kHz acquired by the microphone based on a QMF analysis filter, a high-frequency signal of 8 kHz and a low-frequency signal of 8 kHz are outputted, and subsequent NS and VAD decision only act on the low-frequency signal of 8 kHz. If the terminal is in a microphone on state at this moment, the high-frequency signal of 8 kHz and the low-frequency signal of 8 kHz may be re-synthesized into a super-definition signal of 16 kHz using a QMF synthesis filter, and then the super-definition signal is coded and transmitted.

In some embodiments, in a case that the terminal is in the microphone on state, prior to performing band composition and coding transmission on the audio signal, AGC processing is also supported on the audio signal even if a gain parameter of an amplification circuit is automatically adjusted with the signal strength, thereby improving the transmission effect of the audio signal.

Figure 10:
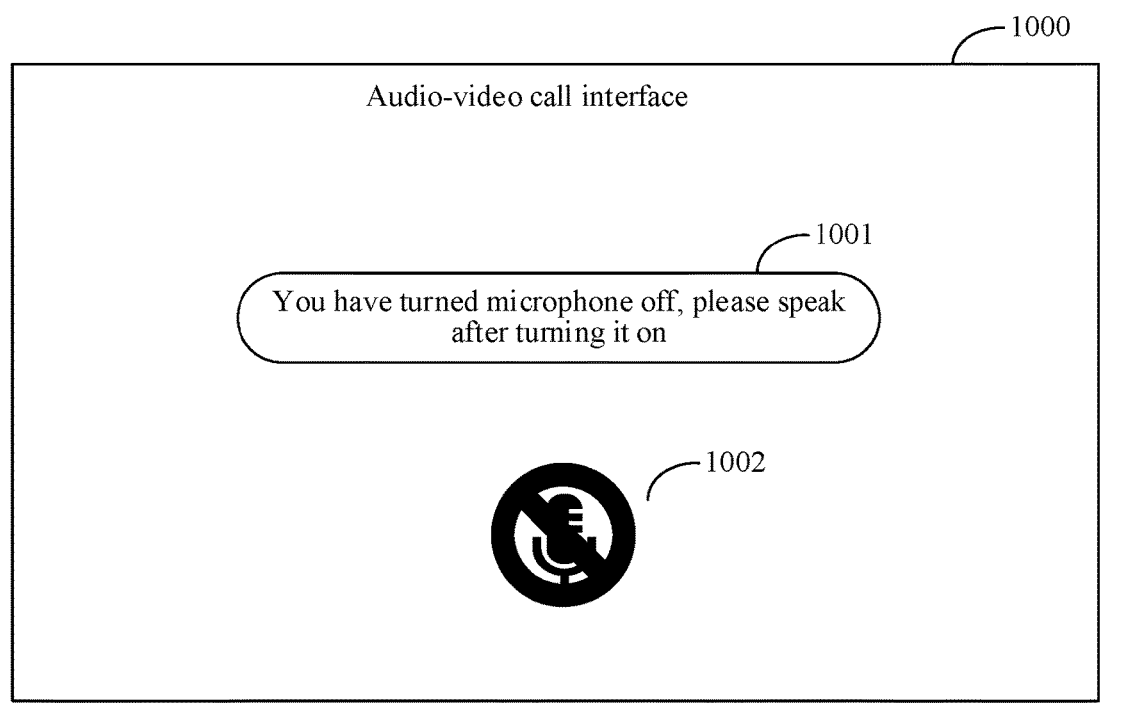
FIG. 10 is a schematic diagram of a text prompt message according to an embodiment of the disclosure.

FIG. 10 is a schematic diagram of a text prompt message according to an embodiment of the disclosure. As shown in FIG. 10, if a target voice is contained in an audio signal, a terminal displays a text prompt message 1001 "You have turned microphone off, please speak after turning it on" in a call interface 1000 of a multi-person voice call, and displays a microphone setting control 1002 in a disable state. The text prompt message 1001 is used for prompting a user to set the microphone setting control 1002 from the disable state to an enable state by clicking/tapping the microphone setting control 1002 in the disable state, so as to disable a microphone mute state.

All the foregoing optional technical solutions can be combined in any form to form optional embodiments of the present disclosure, and will not be described in detail herein.

According to the method provided in this embodiment of the disclosure, an application still acquires an audio signal of a user in a case of being in a microphone mute state in a multi-person voice call, but does not transmit the acquired audio signal to other accounts participating in the multi-person voice call. The application performs signal analysis and processing on the audio signal, and determines whether a target voice is contained in the audio signal by using gain parameters of multiple audio frames in the audio signal respectively on multiple bands in a first band range. If the target voice is contained in the audio signal, it is indicated that the user starts to speak without disabling the microphone mute state, so as to output a prompt message externally, thereby prompting the user to disable the microphone mute state in time, reducing the loss of communication efficiency caused by the user having not found that the microphone is mute, improving the human-computer interaction efficiency, and optimizing user experience.

In a test scene, several pure noises, pure voices (male voice, female voice, Chinese, and English) and noisy voices in multiple scenes are respectively selected to test the stability and sensitivity of the audio signal processing method provided by the foregoing embodiments. Steady-state noises (car noise, wind noise, street noise, subway noise, coffee hall noise, and the like) and non-steady-state noises (construction site noise, keyboard noise, table noise, tapping, human voice, and the like) are introduced respectively. Since the method provided by various embodiments of the disclosure does not rely on conventional energy-only VAD detection, there is a certain improvement in the accuracy of human voice detection in an audio signal. Also, it does not rely on a complex CNN model, and therefore the computing cost is guaranteed. The method provided by various embodiments of the disclosure can be used in various audio-video call scenes or audio-video conferences, such as a voice call, a video call, a multi-person voice call, a multi-person video call, or screen sharing, and can also be used in multiple livestreaming or communication products and social software, so as to meet computing demands with the minimum energy consumption of a mobile end.

Figure 11:
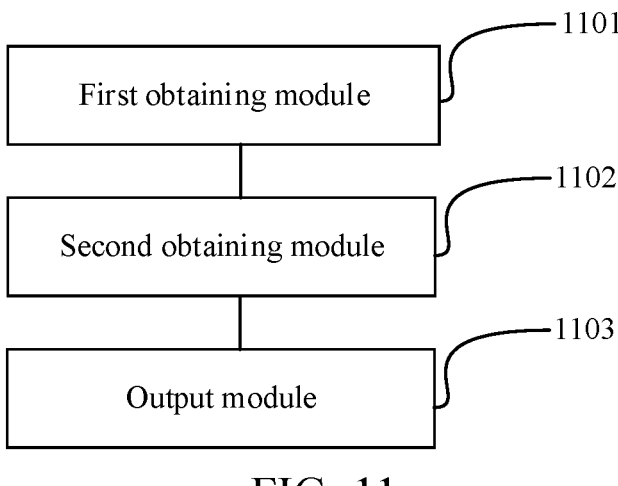
FIG. 11 is a schematic structural diagram of an audio signal processing apparatus according to an embodiment of the disclosure.

FIG. 11 is a schematic structural diagram of an audio signal processing apparatus according to an embodiment of the disclosure. Referring to FIG. 11, the apparatus includes:

a first obtaining module 1101, configured to obtain an audio signal acquired by an application in a target scene, the target scene referring to that an account logging in the application is in a microphone mute state in a multi-person voice call;

a second obtaining module 1102, configured to obtain gain parameters of multiple audio frames in the audio signal respectively on multiple bands in a first band range; and an output module 1103, configured to output a prompt message in a case of determining, based on the gain parameters, that a target voice is contained in the audio signal, the prompt message being used for prompting to disable the microphone mute state.

According to the apparatus provided in this embodiment of the disclosure, an application still acquires an audio signal of a user in a case of being in a microphone mute state in a multi-person voice call, but does not transmit the acquired audio signal to other accounts participating in the multi-person voice call. The application performs signal analysis and processing on the audio signal, and determines whether a target voice is contained in the audio signal by using gain parameters of multiple audio frames in the audio signal respectively on multiple bands in a first band range. If the target voice is contained in the audio signal, it is indicated that the user starts to speak without disabling the microphone mute state, so as to output a prompt message externally, thereby prompting the user to disable the microphone mute state in time, reducing the loss of communication efficiency caused by the user having not found that the microphone is mute, and improving the human-computer interaction efficiency.

In a possible implementation, the second obtaining module 1102 includes:

a preprocessing unit, configured to preprocess the audio signal to obtain a first signal; and a processing unit, configured to input multiple audio frames in the first signal into an NS model, process each audio frame in the multiple audio frames by the NS model, and output a gain parameter of each audio frame on each band in the first band range, the gain parameter of the audio frame on a human voice band being greater than the gain parameter on a noise band.

In a possible implementation, the NS model is an RNN. The RNN includes at least one hidden layer. Each hidden layer includes multiple neurons. The number of neurons in each hidden layer is the same as the number of inputted audio frames.

The processing unit is configured to:

weight, through any neuron in any hidden layer in the RNN, a frequency feature outputted by a previous neuron in this hidden layer and a frequency feature outputted by a neuron at a corresponding position in a previous hidden layer, and input the frequency features obtained by weighting to a next neuron in this hidden layer and a neuron at a corresponding position in a next hidden layer respectively.

In a possible implementation, based on the apparatus components in FIG. 11, the apparatus further includes:

a first determination module, configured to determine voice state parameters of the multiple audio frames based on the gain parameters of the multiple audio frames on the multiple bands, the voice state parameters being used for representing whether a corresponding audio frame contains a target voice; and a second determination module, configured to determine that the target voice is contained in the audio signal in a case that voice state parameters of any audio frame and a target number of audio frames preceding the audio frame satisfy a first condition.

In a possible implementation, based on the apparatus components in FIG. 11, the first determination module includes:

a first determination unit, configured to determine a gain parameter of each audio frame on each band in a second band range based on the gain parameter of the audio frame on each band in the first band range, the second band range being a subset of the first band range; and a second determination module, configured to determine a voice state parameter of the audio frame based on the gain parameter of the audio frame on each band in the second band range.

In a possible implementation, based on the apparatus components in FIG. 11, the second determination unit includes:

a multiplication subunit, configured to multiply the gain parameter of the audio frame on each band in the second band range by a weight coefficient of a corresponding band to obtain a weighted gain parameter of the audio frame on each band in the second band range;

an addition subunit, configured to add the weighted gain parameters of the audio frame on the respective bands in the second band range to obtain a comprehensive gain parameter of the audio frame; and a determination subunit, configured to determine a voice state parameter of the audio frame based on the comprehensive gain parameter of the audio frame.

In a possible implementation, the determination subunit is configured to:

determine that the voice state parameter is "containing a target voice" in a case that the comprehensive gain parameter amplified by a target multiple is greater than an activation threshold; and determine that the voice state parameter is "not containing a target voice" in a case that the comprehensive gain parameter amplified by the target multiple is less than or equal to the activation threshold.

In a possible implementation, based on the apparatus components in FIG. 11, the apparatus further includes:

a third obtaining module, configured to obtain energy parameters of the multiple audio frames.

The first determination module includes:

a third determination unit, configured to determine voice state parameters of the multiple audio frames based on the gain parameters of the multiple audio frames on the multiple bands and the energy parameters of the multiple audio frames.

In a possible implementation, the third determination unit is configured to:

determine a comprehensive gain parameter of each audio frame based on the gain parameters of the audio frame on the multiple bands;

determine that the voice state parameter of the audio frame is "containing a target voice" in a case that the comprehensive gain parameter of the audio frame amplified by a target multiple is greater than an activation threshold and the energy parameter of the audio frame is greater than an energy threshold; and determine that the voice state parameter of the audio frame is "not containing a target voice" in a case that the comprehensive gain parameter of the audio frame amplified by the target multiple is less than or equal to the activation threshold or the energy parameter of the audio frame is less than or equal to the energy threshold.

In a possible implementation, based on the apparatus components in FIG. 11, the second determination module includes:

a fourth determination unit, configured to determine, based on the voice state parameters of any audio frame and a first target number of audio frames preceding the audio frame, an activation state of an audio frame group where the audio frame is located, the audio frame group including the audio frame and the first target number of audio frames preceding the audio frame; and a fifth determination unit, configured to determine that the target voice is contained in the audio signal in a case that the activation states of the audio frame group and a second target number of audio frame groups preceding the audio frame group satisfy a second condition, the target number being determined based on the first target number and the second target number.

In a possible implementation, the fourth determination unit is configured to:

determine that the activation state of the audio frame group is activated in a case that a voice state parameter in the audio frame group is that the number of audio frames containing the target voice exceeds a number threshold; and determine that the activation state of the audio frame group is unactivated in a case that the voice state parameter in the audio frame group is that the number of audio frames containing the target voice does not exceed the number threshold.

In a possible implementation, based on the apparatus components in FIG. 11, the apparatus further includes:

an NS module, configured to perform NS on the multiple audio frames based on the gain parameters of the multiple audio frames on the multiple bands to obtain multiple target audio frames;

a VAD module, configured to perform VAD based on energy parameters of the multiple target audio frames to obtain VAD values of the multiple target audio frames; and a third determination module, configured to determine that the target voice is contained in the audio signal in a case that the VAD values of the multiple target audio frames satisfy a third condition.

In a possible implementation, the target voice is a speech of a target object in the multi-person voice call. Or, the target voice is a sound of the target object.

All the foregoing optional technical solutions can be combined in any form to form optional embodiments of the present disclosure, and will not be described in detail herein.

It is to be noted that the audio signal processing apparatus provided in the foregoing embodiments is illustrated with only an example of division of the foregoing function modules when processing an audio signal. In practical application, the foregoing functions may be allocated to and completed by different function modules according to requirements. That is, the internal structure of the electronic device is divided into different function modules, so as to complete all or part of the functions described above. In addition, the audio signal processing apparatus provided in the foregoing embodiments and the audio signal processing method embodiments fall within the same conception. An implementation process thereof is described in detail with reference to the audio signal processing method embodiments and will not be repeated herein.

Figure 12:
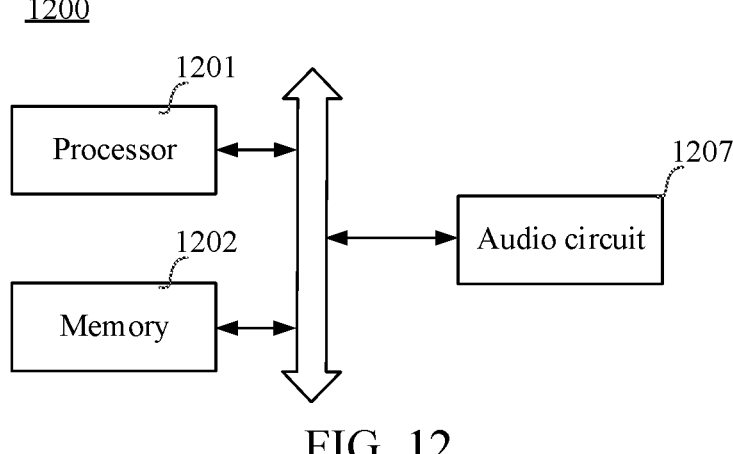
FIG. 12 is a schematic structural diagram of an electronic device according to an embodiment of the disclosure.

FIG. 12 is a schematic structural diagram of an electronic device according to an embodiment of the disclosure. As shown in FIG. 12, a terminal 1200 serving as the electronic device is described. Optionally, device types of the terminal 1200 include: a smartphone, a tablet personal computer, a moving picture experts group audio layer III (MP3) player, a moving picture experts group audio layer IV (MP4) player, a laptop computer, or a desktop computer. The terminal 1200 may also be referred to as another name such as user equipment, a portable terminal, a laptop terminal, or a desktop terminal.

Generally, the terminal 1200 includes: a processor 1201 and a memory 1202.

Optionally, the processor 1201 includes one or more processing cores, such as a 4-core processor or an 8-core processor. Optionally, the processor 1201 is implemented by at least one hardware form in a digital signal processing (DSP), a field-programmable gate array (FPGA), and a programmable logic array (PLA). In some embodiments, the processor 1201 includes a main processor and a co-processor. The main processor is a processor for processing data in a wake-up state, and is also referred to as a central processing unit (CPU). The co-processor is a low-power processor for processing data in a standby state. In some embodiments, the processor 1201 is comprehensive with a graphics processing unit (GPU). The GPU is responsible for rendering and drawing content to be displayed by a display screen. In some embodiments, the processor 1201 further includes an artificial intelligence (AI) processor. The AI processor is configured to process computing operations related to machine learning.

In some embodiments, the memory 1202 includes one or more computer-readable storage media. Optionally the computer-readable storage medium is non-transitory. Optionally, the memory 1202 further includes a high-speed random access memory and a nonvolatile memory, such as one or more disk storage devices or flash storage devices. In some embodiments, the non-transitory computer-readable storage medium in the memory 1202 is configured to store at least one program code. The at least one program code is used for execution by the processor 1201 to implement the audio signal processing method according to the various embodiments of the disclosure.

In some embodiments, the terminal 1200 further optionally includes: an audio circuit 1207.

In some embodiments, the audio circuit 1207 includes a microphone and a speaker. The microphone is configured to acquire sound waves of a user and an environment, and convert the sound waves into an electrical signal to be inputted to the processor 1201 for processing, or inputted to a radio frequency circuit (not depicted) for implementing voice communication. For the purpose of stereo acquisition or noise reduction, there are multiple microphones disposed at different parts of the terminal 1200 respectively. Optionally, the microphones are array microphones or omni-directional acquisition type microphones. The speaker is configured to convert electrical signals from the processor 1201 or the radio frequency circuit into sound waves. Optionally, the speaker is a conventional film speaker, or a piezoelectric ceramic speaker. When the speaker is a piezoelectric ceramic speaker, not only an electrical signal can be converted into a sound wave audible to human beings, but also an electrical signal can be converted into a sound wave inaudible to human beings for ranging purposes. In some embodiments, the audio circuit 1207 further includes a headphone jack.

Figure 13:
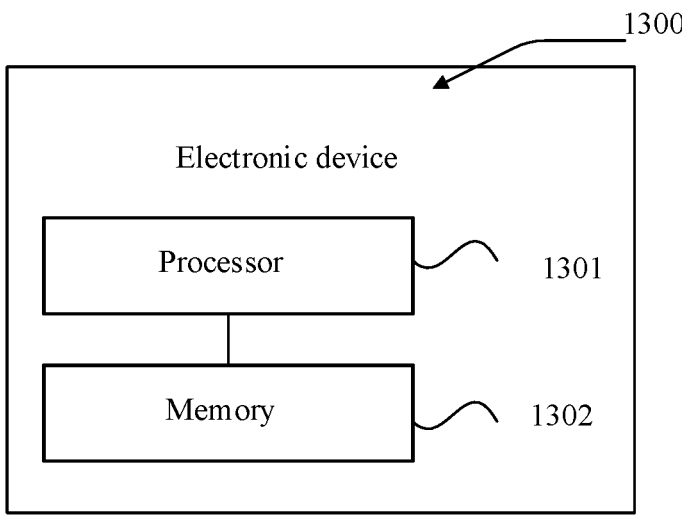
FIG. 13 is a schematic structural diagram of an electronic device according to an embodiment of the disclosure.

FIG. 13 is a schematic structural diagram of an electronic device according to an embodiment of the disclosure. The electronic device 1300 may vary largely due to different configurations or performance. The electronic device 1300 includes one or more central processing units (CPUs) 1301 and one or more memories 1302. The one or more memories 1302 store at least one computer program. The at least one computer program is loaded and executed by the one or more CPUs 1301 to implement the audio signal processing method provided in the foregoing embodiments. Optionally, the electronic device 1300 also has components such as a wired or wireless network interface, a keyboard, and an input/output interface for input/output. The electronic device

1300 also includes other components for realizing the functions of the device, which will not be described in detail herein.

In an exemplary embodiment, a computer-readable storage medium, for example, a memory including at least one computer program is also provided. The at least one computer program may be executed by a processor in a terminal to complete the audio signal processing method in the foregoing embodiments. For example, the computer-readable storage medium includes a read-only memory (ROM), a random-access memory (RAM), a compact disc read-only memory (CD-ROM), a magnetic tape, a floppy disk, an optical data storage device, and the like.

In an exemplary embodiment, a computer program product or a computer program is also provided, including one or more program codes. The one or more program codes are stored in a computer-readable storage medium. One or more processors of an electronic device are capable of reading the one or more program codes from the computer-readable storage medium. The one or more processors execute the one or more program codes, whereby the electronic device completes the audio signal processing method in the foregoing embodiments.

A person of ordinary skill in the art will appreciate that all or part of the operations for implementing the foregoing embodiments can be completed by hardware as well as by programming associated hardware. The program is stored in a computer-readable storage medium. Optionally, the above-mentioned storage medium is a ROM, a magnetic or optical disk, or the like.

The foregoing descriptions are merely optional embodiments of the disclosure, but are not intended to limit the disclosure. Any modification, equivalent replacement, or improvement made within the spirit and principle of the disclosure shall fall within the protection scope of the disclosure.

What is claimed is:

1. An audio signal processing method, performed by at least one processor on a terminal, the method comprising:
   obtaining an audio signal acquired by an application while an account logging into the application is in a microphone mute state in a multi-person voice call;
   obtaining gain parameters, for each of a plurality of audio frames in the audio signal, respectively on a plurality of bands in a first band range, and the gain parameters are obtained by inputting data of the audio signal into a noise suppression (NS) model of a recurrent neural network (RNN); and
   outputting a prompt message responsive to a determination, based on the gain parameters, that a target voice is contained in the audio signal, the prompt message providing a prompt to disable the microphone mute state of the account,
   wherein the gain parameters are obtained by:
   preprocessing the audio signal to obtain a first signal, the first signal comprising the data of the audio signal; and
   inputting a plurality of audio frames in the first signal into the noise suppression (NS) model, and processing each audio frame in the plurality of audio frames by the NS model to thereby output a gain parameter of each audio frame on each band in the first band range, the gain parameter of the audio frame on a human voice band being greater than the gain parameter on a noise band,
   wherein the RNN comprises at least one hidden layer, each hidden layer comprises a plurality of neurons, and the number of neurons in each hidden layer is equal to the number of inputted audio frames, and the NS model processes each audio frame by:

weighting, through a present neuron in a present hidden layer in the RNN, a first frequency feature outputted by a previous neuron in the present hidden layer and a second frequency feature outputted by a neuron at a corresponding position in a previous hidden layer, and inputting the weighted first and second frequency features to a next neuron in the present hidden layer and a neuron at a corresponding position in a next hidden layer respectively.

2. The method according to claim 1, wherein the target voice is determined to be contained in the audio signal by:

determining voice state parameters of the plurality of audio frames based on the gain parameters of the plurality of audio frames on the plurality of bands, the voice state parameters being used for representing whether a corresponding audio frame contains a target voice; and determining, based on the voice state parameters of the plurality of audio frames, that the target voice is contained in the audio signal.

3. The method according to claim 2, wherein the voice state parameters are determined by:

determining a gain parameter of each audio frame on each band in a second band range based on the gain parameter of the audio frame on each band in the first band range, the second band range being a subset of the first band range; and determining a voice state parameter of each audio frame based on the gain parameter of the audio frame on each band in the second band range.

4. The method according to claim 3, wherein the voice state parameter of each audio frame is determined by:

multiplying the gain parameter of the audio frame on each band in the second band range by a weight coefficient of a corresponding band to obtain a weighted gain parameter of the audio frame on each band in the second band range;

adding the weighted gain parameters of the audio frame on the respective bands in the second band range to obtain a comprehensive gain parameter of the audio frame; and determining the voice state parameter of the audio frame based on the comprehensive gain parameter of the audio frame.

5. The method according to claim 4, wherein the voice state parameter of each audio frame is determined based on the comprehensive gain parameter by:

determining that the voice state parameter indicates the target voice when the comprehensive gain parameter amplified by a target multiple is greater than an activation threshold; and determining that the voice state parameter indicates lack of the target voice when the comprehensive gain parameter amplified by the target multiple is less than or equal to the activation threshold.

6. The method according to claim 2, further comprising obtaining energy parameters of the plurality of audio frames, wherein the voice state parameters of the plurality of audio frames are determined based on the gain parameters of the plurality of audio frames on the plurality of bands and the energy parameters of the plurality of audio frames.

7. The method according to claim 6, wherein the voice state parameters of the plurality of audio frames are determined by:

determining a comprehensive gain parameter of each audio frame based on the gain parameters of the audio frame on the plurality of bands;

determining that the voice state parameter of each audio frame indicates that the audio frame contains the target voice when the comprehensive gain parameter of the audio frame amplified by a target multiple is greater than an activation threshold and the energy parameter of the audio frame is greater than an energy threshold; and determining that the voice state parameter of each audio frame indicates that the audio frame does not contain the target voice when the comprehensive gain parameter of the audio frame amplified by the target multiple is less than or equal to the activation threshold or the energy parameter of the audio frame is less than or equal to the energy threshold.

8. The method according to claim 2, wherein the target voice is determined to be contained in the audio signal based on voice state parameters of an audio frame and a target number of audio frames preceding the audio frame satisfying a first condition.

9. The method according to claim 8, wherein the target voice is determined to be contained in the audio signal by:

determining, based on the voice state parameters of the audio frame and of a first target number of audio frames preceding the audio frame, an activation state of an audio frame group comprising the audio frame and the first target number of audio frames preceding the audio frame; and determining that the target voice is contained in the audio signal when the activation states of the audio frame group and of a second target number of audio frame groups preceding the audio frame group satisfy a second condition, the target number of audio frames being determined based on the first target number and the second target number.

10. The method according to claim 9, wherein the activation state of the audio frame group comprising the audio frame is determined by:

determining that the activation state of the audio frame group is activated when the number of audio frames containing the target voice exceeds a number threshold; and determining that the activation state of the audio frame group is unactivated when the number of audio frames containing the target voice does not exceed the number threshold.

11. The method according to claim 1, wherein the target voice is determined to be contained in the audio signal by:

performing noise suppression on the plurality of audio frames, based on the gain parameters of the plurality of audio frames, on the plurality of bands to obtain a plurality of target audio frames;

performing voice activity detection (VAD) based on energy parameters of the plurality of target audio frames to obtain VAD values of the plurality of target audio frames; and determining that the target voice is contained in the audio signal when the VAD values of the plurality of target audio frames satisfy a third condition.

12. The method according to claim 1, wherein the target voice is one of: a speech of a target object in the multi-person voice call, or a sound of the target object.

13. The method according to claim 1, further comprising, responsive to the determination that the target voice is contained in the audio signal, automatically disabling the microphone mute state of the account.

14. An audio signal processing apparatus, disposed in a terminal, the apparatus comprising:

at least one memory configured to store program code; and at least one processor configured to read the program code and operate as instructed by the program code, the program code comprising:

first obtaining code, configured to cause the at least one processor to obtain an audio signal acquired by an application while an account logging into the application is in a microphone mute state in a multi-person voice call;

second obtaining code, configured to cause the at least one processor to obtain gain parameters, for each of a plurality of audio frames in the audio signal, respectively on a plurality of bands in a first band range, and the gain parameters are obtained by inputting data of the audio signal into a noise suppression (NS) model of a recurrent neural network (RNN)I; and output code, configured to cause the at least one processor to output a prompt message responsive to a determination, based on the gain parameters, that a target voice is contained in the audio signal, the prompt message providing a prompt to disable the microphone mute state of the account, wherein the gain parameters are obtained by:

preprocessing the audio signal to obtain a first signal, the first signal comprising the data of the audio signal; and inputting a plurality of audio frames in the first signal into the noise suppression (NS) model, and processing each audio frame in the plurality of audio frames by the NS model to thereby output a gain parameter of each audio frame on each band in the first band range, the gain parameter of the audio frame on a human voice band being greater than the gain parameter on a noise band, wherein the RNN comprises at least one hidden layer, each hidden layer comprises a plurality of neurons, and the number of neurons in each hidden layer is equal to the number of inputted audio frames, and the NS model processes each audio frame by:

weighting, through a present neuron in a present hidden layer in the RNN, a first frequency feature outputted by a previous neuron in the present hidden layer and a second frequency feature outputted by a neuron at a corresponding position in a previous hidden layer, and inputting the weighted first and second frequency features to a next neuron in the present hidden layer and a neuron at a corresponding position in a next hidden layer respectively.

15. The apparatus according to claim 14, wherein the target voice is determined to be contained in the audio signal by:

determining voice state parameters of the plurality of audio frames based on the gain parameters of the plurality of audio frames on the plurality of bands, the voice state parameters being used for representing whether a corresponding audio frame contains a target voice; and determining, based on the voice state parameters of the plurality of audio frames, that the target voice is contained in the audio signal.

16. The apparatus according to claim 14, wherein the target voice is determined to be contained in the audio signal by:

performing noise suppression on the plurality of audio frames, based on the gain parameters of the plurality of audio frames, on the plurality of bands to obtain a plurality of target audio frames;

performing voice activity detection (VAD) based on energy parameters of the plurality of target audio frames to obtain VAD values of the plurality of target audio frames; and determining that the target voice is contained in the audio signal when the VAD values of the plurality of target audio frames satisfy a third condition.

17. A non-transitory computer-readable storage medium, the storage medium storing at least one computer program, the at least one computer program being executable by a processor to perform audio signal processing operations of:

obtaining an audio signal acquired by an application while an account logging into the application is in a microphone mute state in a multi-person voice call;

obtaining gain parameters, for each of a plurality of audio frames in the audio signal, respectively on a plurality of bands in a first band range, and the gain parameters are obtained by inputting data of the audio signal into a noise suppression (NS) model of a recurrent neural network (RNN); and outputting a prompt message responsive to a determination, based on the gain parameters, that a target voice is contained in the audio signal, the prompt message providing a prompt to disable the microphone mute state of the account, wherein the gain parameters are obtained by:

preprocessing the audio signal to obtain a first signal, the first signal comprising the data of the audio signal; and inputting a plurality of audio frames in the first signal into the noise suppression (NS) model, and processing each audio frame in the plurality of audio frames by the NS model to thereby output a gain parameter of each audio frame on each band in the first band range, the gain parameter of the audio frame on a human voice band being greater than the gain parameter on a noise band, wherein the RNN comprises at least one hidden layer, each hidden layer comprises a plurality of neurons, and the number of neurons in each hidden layer is equal to the number of inputted audio frames, and the NS model processes each audio frame by:

weighting, through a present neuron in a present hidden layer in the RNN, a first frequency feature outputted by a previous neuron in the present hidden layer and a second frequency feature outputted by a neuron at a corresponding position in a previous hidden layer, and inputting the weighted first and second frequency features to a next neuron in the present hidden layer and a neuron at a corresponding position in a next hidden layer respectively.

\* \* \* \* \*